United States Patent
Tredwell et al.

(10) Patent No.: US 8,983,036 B2
(45) Date of Patent: Mar. 17, 2015

(54) RADIOGRAPHIC DETECTOR WITH RAPID POWER-UP, IMAGING APPARATUS AND METHODS USING THE SAME

(75) Inventors: Timothy J. Tredwell, Fairport, NY (US); Jeff Hsin Chang, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 591 days.

(21) Appl. No.: 13/341,969

(22) Filed: Dec. 31, 2011

(65) Prior Publication Data

US 2013/0170620 A1    Jul. 4, 2013

(51) Int. Cl.
- H05G 1/58 (2006.01)
- H05G 1/64 (2006.01)
- G01T 1/24 (2006.01)
- H04N 5/335 (2011.01)

(52) U.S. Cl.
USPC ....... 378/98.8; 378/91; 378/114; 250/370.08; 250/370.09; 250/370.01; 348/301

(58) Field of Classification Search
USPC .......... 378/21, 91, 98.8, 98.9, 114, 116, 176, 378/210; 348/301, 302, 308; 250/370.01, 250/370.08, 370.09, 371, 390.02
See application file for complete search history.

(56) References Cited

U.S. PATENT DOCUMENTS

| | | | |
|---|---|---|---|
| 5,920,070 A * | 7/1999 | Petrick et al. | 250/370.09 |
| 7,211,802 B1 | 5/2007 | Dhurjaty et al. | |
| 7,211,803 B1 | 5/2007 | Dhurjaty et al. | |
| 7,569,832 B2 * | 8/2009 | Tredwell et al. | 250/370.11 |
| 7,593,508 B2 | 9/2009 | Tsuchiya | |
| 7,834,321 B2 * | 11/2010 | Yorkston et al. | 250/370.09 |
| 2008/0011960 A1 * | 1/2008 | Yorkston et al. | 250/370.09 |
| 2008/0245968 A1 * | 10/2008 | Tredwell et al. | 250/370.09 |
| 2009/0072158 A1 | 3/2009 | Jung et al. | |
| 2009/0073295 A1 | 3/2009 | Sugiyama et al. | |
| 2009/0268070 A1 | 10/2009 | Hosier | |
| 2010/0108898 A1 | 5/2010 | Zhang et al. | |

FOREIGN PATENT DOCUMENTS

JP    2001-103378    4/2001

OTHER PUBLICATIONS

International Search Report mailed Mar. 29, 2013 for International Application No. PCT/US2012/068156, 3 pages.

* cited by examiner

*Primary Examiner* — Bernard E Souw

(57) ABSTRACT

Embodiments of methods/apparatus can transition a DR detector imaging array to low power photosensor mode where a first voltage is applied across the photosensors. Embodiments of methods/apparatus can provide an area radiographic imaging array including a plurality of pixels arranged in a matrix at the imaging array where each pixel can include at least one electrically chargeable photosensor and at least one transistor, row address circuits, signal sensing circuits, and photosensor power control circuitry to maintain a first voltage across photosensors of the portion of the imaging array when the detector is between imaging operations. In one embodiment, photosensor power control circuitry can maintain the first voltage across the photosensors when a power consumption of the signal sensing circuits is less than 1% of the power consumption of the signal sensing circuits during readout of a signal from the portion of the imaging array.

20 Claims, 20 Drawing Sheets

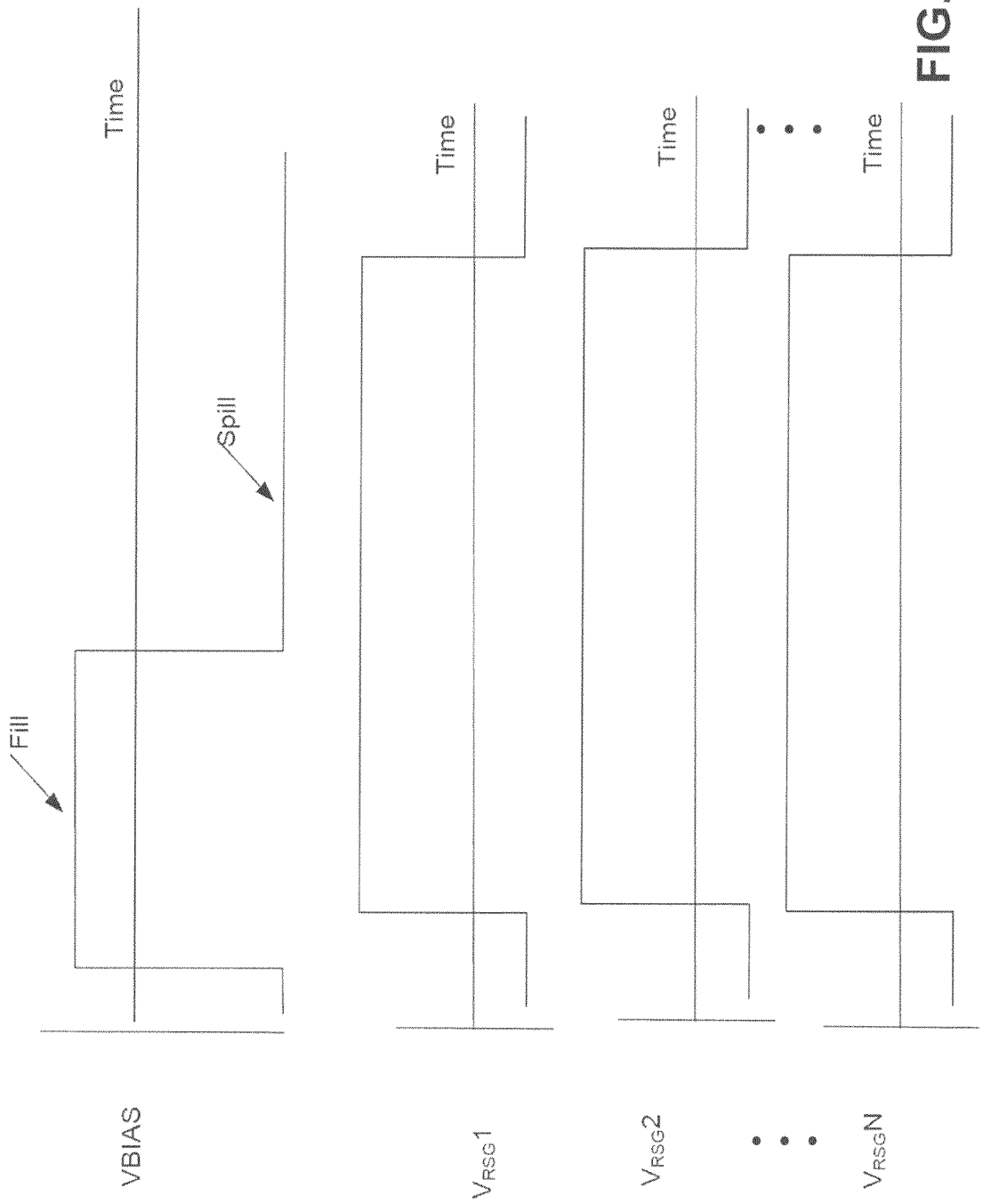

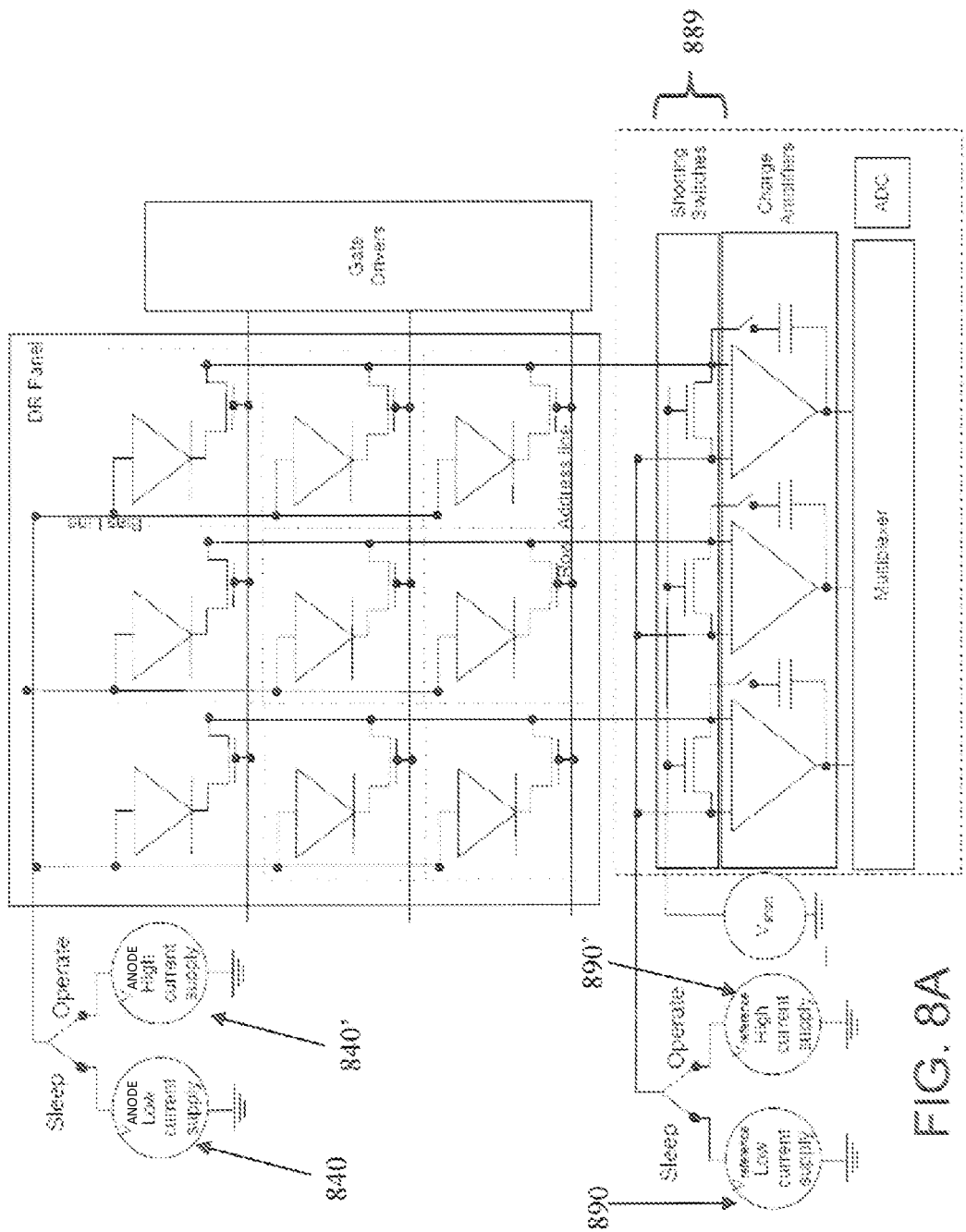

RADIOGRAPHIC DETECTOR WITH RAPID POWER-UP, IMAGING APPARATUS AND METHODS USING THE SAME

FIELD OF THE INVENTION

The invention relates generally to the field of medical imaging, and in particular to radiographic imaging and digital radiographic (DR) detectors and more particularly to mitigation of potential loss of image quality in x-rays images intended for diagnostic purposes related to the use of non-single crystalline materials therein.

BACKGROUND

Stationary radiographic imaging equipment are employed in medical facilities (e.g., in a radiological department) to capture medical x-ray images on x-ray detectors. Mobile carts can include an x-ray source used to capture (e.g., digital) x-ray images on x-ray detector. Such medical x-ray images can be captured using various techniques such as computed radiography (CR) and digital radiography (DR) in radiographic detectors.

A related art digital radiography (DR) imaging panel acquires image data from a scintillating medium using an array of individual sensors, arranged in a row-by-column matrix, in which each sensor provides a single pixel of image data. Each pixel generally includes a photosensor and a switching element that can be arranged in a co-planar or a vertically integrated manner, as is generally known in the art. In these imaging devices, hydrogenated amorphous silicon (a-Si:H) is commonly used to form the photodiode and the thin-film transistor switch needed for each pixel. In one known imaging arrangement, a frontplane has an array of photosensitive elements, and a backplane has an array of thin-film transistor (TFT) switches.

As a result of the non-single crystalline structure of amorphous silicon, a large density of defect states exists within the photosensor. These defect states trap electrons and holes and release them with a time constant determined mainly by the energy level of the defect state, which is in some cases much longer than an imaging frame time. Generally, only trapped electrons of the photosensors are described herein, but it should be understood that holes can be trapped in a like manner and the same mechanisms apply to holes. Therefore, whenever the electric field within the photosensor/photodiode is perturbed either by electrons generated by light from an x-ray exposure, by the bias voltage being varied, or the like, trapped electrons within the photosensor are redistributed among these defect states, generating a detrapping current with a long time constant at the photosensor terminals.

FIG. 1 is a diagram that shows a perspective view of an area detector according to related art including rows and columns of detector cells in position to receive x-rays passing through a patient during a radiographic procedure. As shown in FIG. 1, an x-ray system 10 that can use an area array 12 can include an x-ray tube 14 collimated to provide an area x-ray beam 16 passing through an area 18 of a patient 20. The beam 16 can be attenuated along its many rays by the internal structure of the patient 20 to then be received by the detector array 12 that can extend generally over a prescribed area (e.g., a plane) perpendicular to the central ray of the x-ray beam 16.

The array 12 can be divided into a plurality of individual cells 22 that can be arranged rectilinearly in columns and rows. As will be understood to those of ordinary skill in the art, the orientation of the columns and rows is arbitrary, however, for clarity of description it will be assumed that the rows extend horizontally and the columns extend vertically.

In exemplary operations, the rows of cells 22 can be scanned one (or more) at a time by scanning circuit 28 so that exposure data from each cell 22 may be read by read-out circuit 30. Each cell 22 can independently measure an intensity of radiation received at its surface and thus the exposure data read-out provides one pixel of information in an image 24 to be displayed on a monitor 26 normally viewed by the user. A bias circuit 32 can control a bias voltage to the cells 22.

Each of the bias circuit 32, the scanning circuit 28, and the read-out circuit 30, can communicate with an acquisition control and image processing circuit 34 that can coordinate operations of the circuits 30, 28 and 32, for example, by use of an electronic processor (not shown). The acquisition control and image processing circuit 34, can also control exemplary examination procedures, and the x-ray tube 14, turning it on and off and controlling the tube current and thus the fluence of x-rays in beam 16 and/or the tube voltage and hence the energy of the x-rays in beam 16.

The acquisition control and image processing circuit 34 can provide image data to the monitor 26, based on the exposure data provided by each cell 22. Alternatively, acquisition control and image processing circuit 34 can manipulate the image data, store raw or processed image data (e.g., at a local or remotely located memory) or export the image data.

Exemplary pixels 22 can include a photo-activated image sensing element and a switching element for reading a signal from the image-sensing element. Image sensing can be performed by direct detection, in which case the image-sensing element directly absorbs the X-rays and converts them into charge carriers. However, in most commercial digital radiography systems, indirect detection is used, in which an intermediate scintillator element converts the X-rays to visible-light photons that can then be sensed by a light-sensitive image-sensing element.

Examples of image sensing elements used in image sensing arrays 12 include various types of photoelectric conversion devices (e.g., photosensors) such as photodiodes (P-N or PIN diodes), photo-capacitors (MIS), photo-transistors or photoconductors. Examples of switching elements used for signal read-out include MOS transistors, bipolar transistors and p-n junction components.

DR detectors with amorphous or poly-crystalline photosensors, such as hydrogenated amorphous-silicon photosensors, require a transition from a zero-power state to a stable state ready for exposure of approximately 1-60 seconds. The time for the transition can be limited by the time required for the trap states in such photosensors to transition from a zero-bias state to a state capable of low-noise and stable operation. After an extended time (e.g., over 5-20 minutes) in the zero-bias state, the traps in such photosensors can reach an equilibrium state corresponding to zero-bias. Upon power-up, such photosensors can transition to a reverse-bias state, where the bias voltage between terminals (e.g., anode and cathode) of a photosensor is typically $-3\,V > V_{BIAS} > -6V$. At $V_{BIAS} < -3V$ the electric field across such a photodiode is insufficient to sweep out photo-generated carriers and at $V_{BIAS} > -6V$ the photodiode dark current can increase rapidly because of field-enhanced thermal carrier generation. Trap occupancy in the reverse bias state is considerably lower than in the zero bias state. In the transition from the zero bias state to the reverse bias state, the traps in such photosensors must emit electrons and holes to the conduction band and valance band, respectively. The emission time constant for electrons and holes to be respectively emitted from trap states to the conduction and valance band depends on the energy difference between the trap energy and the respective band edge. For trap states in the center of the band gap, the emission time constant can be more than 10 seconds. The emission time constant also can be very sensitive to the photosensor temperature. If a capture sequence of one or more exposed images and one or more dark reference images is initiated before the photo sensor traps have reached equilibrium in the powered state, then transient charge from trap emission can be sensed in addition to the photo-generated charge and/or the charge from equilibrium dark current. Calibration of the trap emission charge transient is very complex because of its dependence on such exemplary factors including but not limited to time since last exposure, temperature, and time between the power-up and at least one exposure.

FIG. 2 is a flow chart diagram that shows exemplary power-up operation of a related art wireless, portable detector. Prior to power-up or being turned-on, a portable detector can be in a powered-down state since the end of a previous radiographic exposure series (operation block 210). In clinical applications, the time since the last exposure series can range from less than one minute to several days. Upon receipt of an exposure request (e.g., from the acquisition and control image processing 34) via a command interface (operation block 215), the detector can provide power to the digital logic, upon which time the DR detector loads firmware for the support electronics for the backplane (operation block 220). The detector then enables power for the analog electronics, including the gate drivers 28 and the read-out integrated circuits (ROIC's) 32 (operation block 225). The detector then enters a delay period during which the photosensors are stabilized for image capture (operation block 230). During this delay period the detector can, for example, initiate a global reset during which all gate-lines are powered so as to switch the row-select transistors to a conducting state and a net photodiode bias $V_{BIAS}$, which is the difference of the bias supplied to the anode and the reference voltage that is supplied to the cathode (e.g., by the read-out circuits 32 such as charge amplifiers).

$$V_{BIAS} = V_{ANODE} - V_{REFERENCE}$$

Trap states in a photodiode of the detector would emit electrons and holes to the conduction and valence band, respectively, with the detector approaching equilibrium in a time period of ~1 sec to 60 sec. As shown in FIG. 2, after a fixed delay time to allow photosensor equilibration, the detector then acknowledges to the acquisition control and image processing 34 an exposure ready signal (operation block 235), after which the generator is permitted to enter an exposure sequence for the detector (operation block 240). After one or more exposed frames, the detector may acquire one or more dark reference frames (operation block 245). Following transmission of the data to the acquisition control and image processing 34, the dark reference frames are subtracted from the exposed frames to yield an image representative of the photo-generated charge. Then, the portable detector can be powered-down since the radiographic exposure series is complete (operation block 255).

Related art detectors such as described above have various short-comings that can reduce quality of the radiographic image and/or interrupt workflows of radiographic image capture (e.g., x-ray technicians). For example, an extended delay period can be required between receipt of an exposure request and readiness to expose. During this time the patient may move, which can require the image to be taken a second time. Further, even delay times as long as several seconds can be insufficient to completely bring the photosensors (e.g., a:Si) to an equilibrium state, since mid-gap states have emission times of tens of seconds. As a result, there can be an offset between subsequent images that can make accurate subtraction of the dark reference frames difficult or impossible. Since such an offset is temperature dependent, calibration can be complex and difficult. In addition, the time between procedures also affects the offset between subsequent frames, particularly if this time is shorter than 60 seconds for the traps in an exemplary photosensor to equilibrate to the zero-bias state, which can further complicate accurate calibration and subtraction of dark reference frames.

Various U.S. patents address problems of large density of defect states of amorphous semiconductor materials (e.g., a-Si) and disclose various methods of operating DR detectors to reduce artifacts produced thereby. See for example, U.S. Pat. No. 5,920,070 (Petrick et al.) or U.S. Pat. No. 7,593,508 (Tsuchiya).

However, there is a need for improvements in the consistency and/or quality of medical x-ray images, particularly when obtained by an x-ray apparatus designed to operate with amorphous or poly-crystalline photosensors DR x-ray detectors.

SUMMARY OF THE INVENTION

An aspect of this application is to advance the art of medical digital radiography.

Another aspect of this application to address in whole or in part, at least the foregoing and other deficiencies in the related art.

It is another aspect of this application to provide in whole or in part, at least the advantages described herein.

An aspect of this application to is to provide methods and/or apparatus to address and/or reduce disadvantages caused by the use of portable (e.g., wireless) digital radiography (DR) detectors and/or radiography imaging apparatus using the same.

One aspect of this application to is to provide methods and/or apparatus capable of an extremely low power deep-sleep mode that can provide reduced or minimum battery drain during times between radiographic studies.

Another aspect of this application to is to provide methods and/or apparatus that can allow a rapid transition for a radiographic detector from a low-power deep-sleep-mode to a state capable of low-noise image acquisition.

Another aspect of this application to is to provide methods and/or apparatus that can transition from a powered-mode to a deep-sleep-mode in a manner that allows transition to a state capable of low-noise image acquisition.

Another aspect of this application to is to provide methods and/or apparatus that can provide a power control circuit for photosensors in a DR imaging array for a radiographic detector.

In accordance with one embodiment, the present invention can provide a digital radiographic area detector that can include a plurality of pixels including electrically chargeable photosensors arranged over the area detector; a bias control circuit to provide a bias voltage across the photosensors to charge each photosensor; at least one photosensor configured to provide a reading responsive to light delivered to each photosensor; and an apparatus to provide photosensors biases for a detector disabled or deep-sleep mode.

In accordance with one embodiment, there is provided a digital radiographic area detector including an imaging array including a plurality of pixels arranged at the imaging array, each pixel including at least one electrically chargeable photosensor and at least one thin-film transistor; a bias control circuit to provide a bias voltage across the photosensors for a portion of the imaging array; circuits to provide row address for the portion of the imaging array; circuits to provide signal sensing for the portion of the imaging array; and photosensor power control circuitry to maintain a first voltage across photosensors of the portion of the imaging array when a power consumption of the signal sensing circuits is less than 10% of the power consumption of the signal sensing circuits during readout of a signal from the portion of the imaging array.

In accordance with one embodiment, there is provided a method of operating a digital radiographic detector producing at least one image signal, the radiographic detector including a plurality of photosensors arranged in rows and columns, the method including driving the detector in an operating mode where a first voltage is applied across the photosensors; and transitioning the detector to second mode where a second voltage is applied across the photosensors when signal sensing circuits are not able to discern a state of the photosensors.

Exemplary aspects are given only by way of illustrative example, and such aspects may be exemplary of one or more embodiments of the invention. Other desirable objectives and advantages inherently achieved herein may occur or become apparent to those skilled in the art, however, the invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings.

The elements of the drawings are not necessarily to scale relative to each other.

FIGS. 6A-6C are diagrams that show exemplary timing sequences for a photosensor/photodiode initialization for embodiments of imaging arrays of a radiographic detector according to the application.

FIG. 8A is a schematic diagram that shows portions of an imaging array architecture for a radiographic detector including an embodiment of a photosensor bias control circuit according to the application.

DESCRIPTION OF EXEMPLARY EMBODIMENTS

Figure 1:
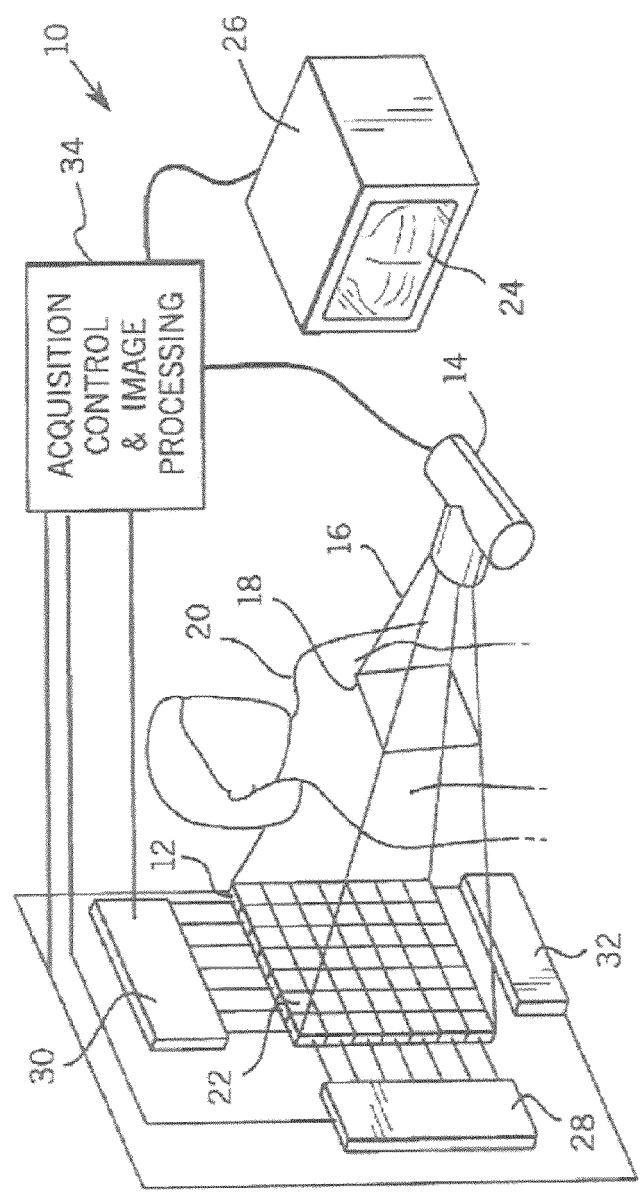
FIG. 1 is a diagram that shows a perspective view of a related art radiographic imaging apparatus including an area detector composed of rows and columns of detector cells in position to receive x-rays passing through a patient during a radiographic procedure.

The following is a description of exemplary embodiments of the invention, reference being made to the drawings in which the same reference numerals identify the same elements of structure in each of the several FIGures.

Where they are used, the terms "first", "second", and so on, do not necessarily denote any ordinal or priority relation, but may be used for more clearly distinguishing one element or time interval from another.

DR detectors with amorphous or poly-crystalline photosensors, such as hydrogenated amorphous-silicon photosensors, require a transition from a zero-power state to a stable state ready for exposure. During the zero power state (e.g., off, powered down), photosensor bias can be 0V and traps (e.g., in a PIN photodiode) can be completely filled, which can take 1 minute, 5 minutes, 10 minutes, 60 minutes or more. During power-up, application of non-zero bias to photodiodes can cause the traps to emit. The rate of trap emission and also the time required to reach a stable operating point can depend on at least temperature and/or readout timing. Embodiments according to this application can provide a deep-sleep mode or photosensor power control circuits in which the photodiode bias is maintained at a prescribed condition, prescribed voltage drop across or a reverse bias (e.g., approximating the reverse bias during image acquisition), which can provide rapid transition to an image ready condition.

Figure 2:
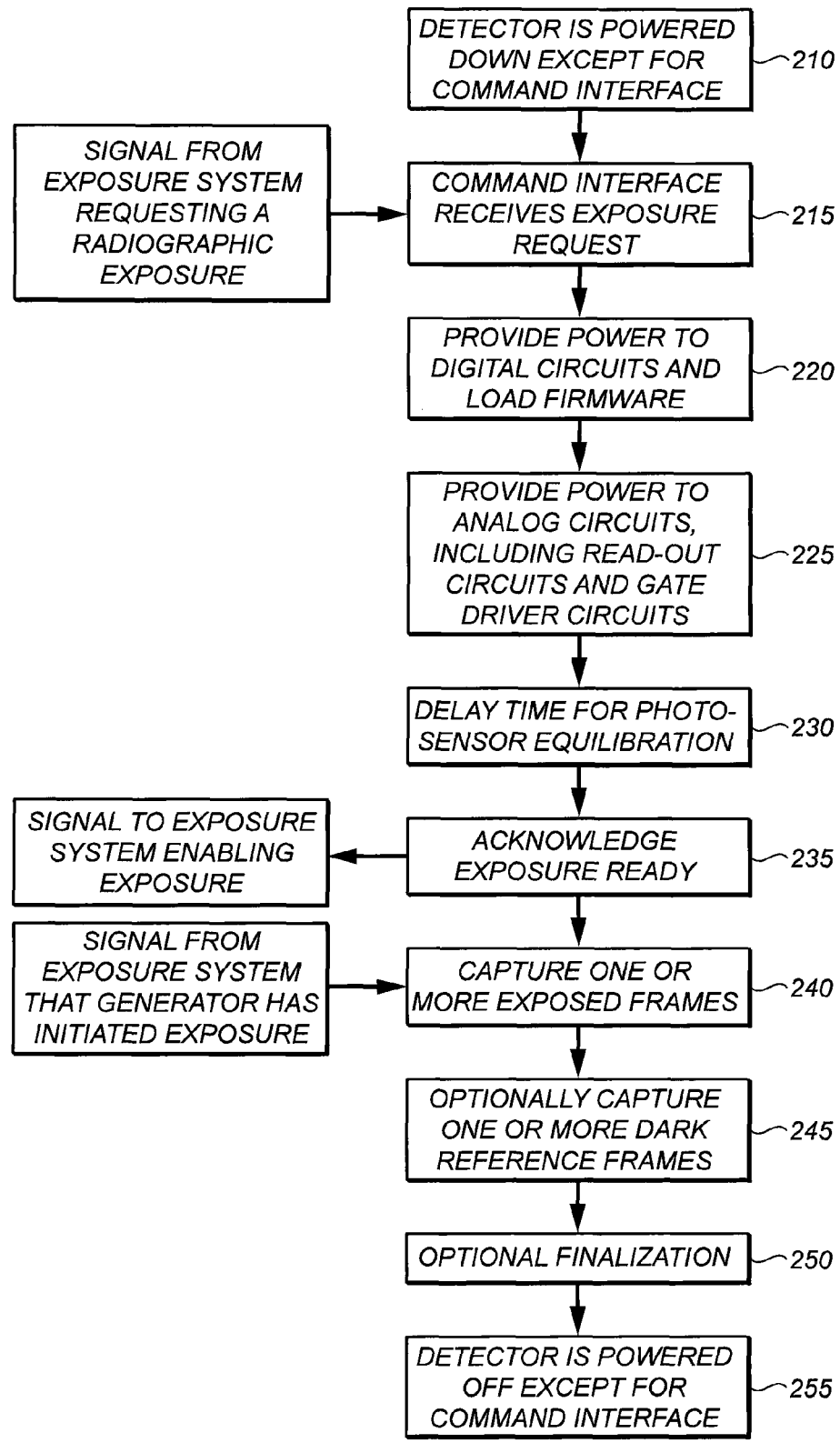
FIG. 2 is a flow chart that shows related art radiographic imaging apparatus operations for an area detector during a radiographic procedure.

In one embodiment, an initialization time can be reduced or eliminated when photosensors can be held in a continuously powered state. In an exemplary case in which the photosensor is a photodiode, providing a constant bias voltage approximating the bias voltage during image capture (e.g., when the DR detector is off) can be sufficient. However, holding the detector in a continuously powered state in a related art detector as illustrated in FIG. 2 requires that the gate drivers, the read-out ICs and/or their power supplies and/or control electronics be powered, which can require 10 W-40 W of power that can quickly discharge the battery and/or significantly increase the temperature of the detector.

Figure 3:
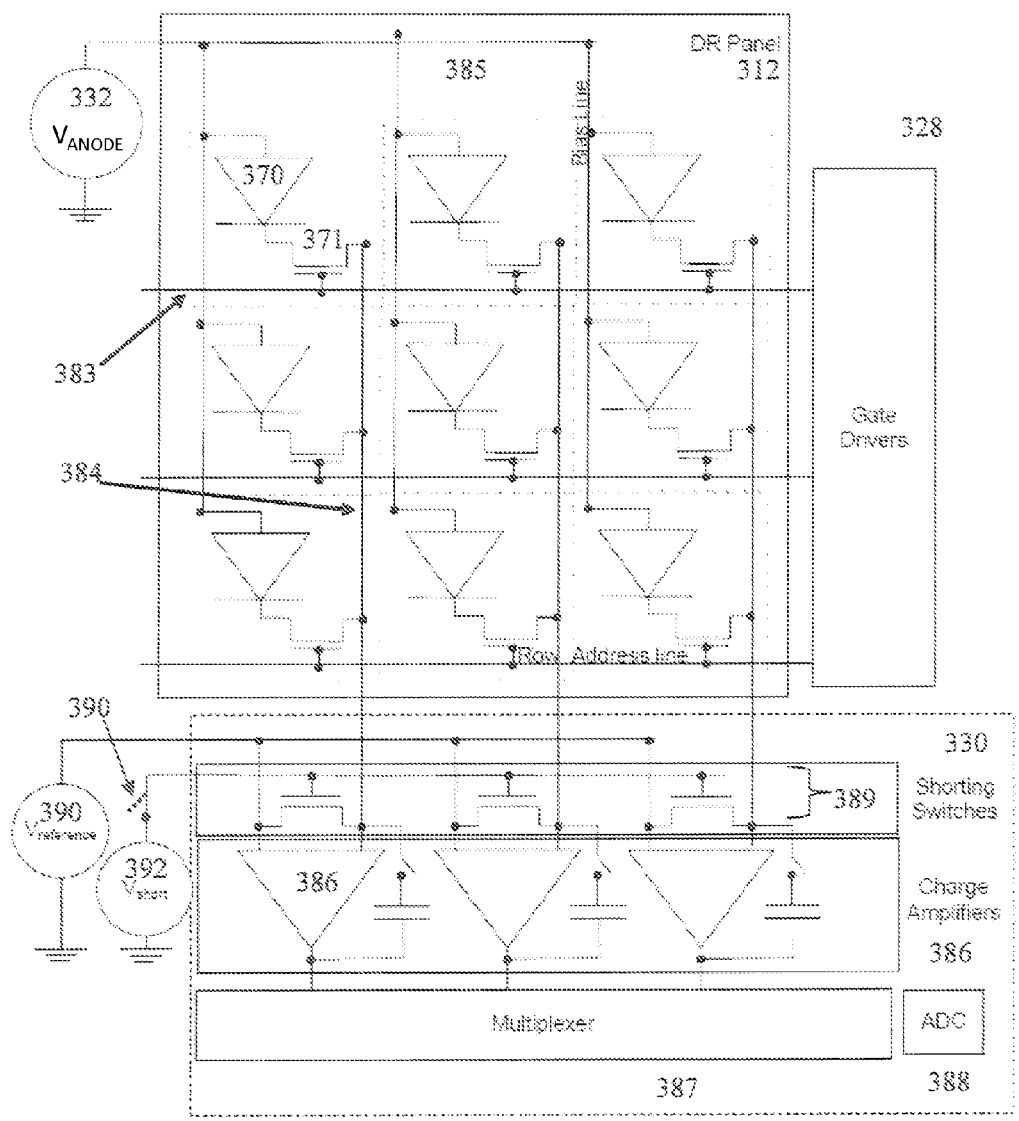
FIG. 3 is a diagram that shows a schematic of a pixel architecture for portions of an imaging array for a radiographic detector including an embodiment of a photosensor power control circuit according to the application.

FIG. 3 is a diagram that shows a schematic of a pixel architecture for portion of an imaging array for a radiographic detector including an embodiment of a photosensor control circuit according to the application. In a hydrogenated amorphous silicon (a-Si:H) based indirect flat panel imager as shown in FIG. 3, incident X-ray photons are converted to optical photons, which are subsequently converted to electron-hole pairs within the a-Si:H n-i-p photodiodes 370. The pixel charge capacity of the photodiodes 370 can be a product of a bias voltage 332 and the photodiode capacitance. In general, a reverse bias voltage can be applied to the bias lines 385 to create an electric field (e.g., a depletion region) across the photodiodes 370 and enhance charge collection efficiency. The image signal can be integrated by the photodiodes 370 while the associated TFTs 371 can be held in a non-conducting ("off") state, for example, by maintaining scan lines or gate lines 383 at a negative voltage. The array can be read out by sequentially switching rows of the TFTs 371 to a conducting state by means of TFT gate control circuitry or gate driver 328. When a row of pixels is switched to a conducting ("on") state, for example by applying a positive voltage to the corresponding gate line 383, charge from those pixels can be transferred along data lines 384 and integrated by external charge-sensitive amplifiers 386. A row of pixels can then be switched back to a non-conducting state, and the process can be repeated for each row until the entire array has been read out. The signal outputs from the external charge-sensitive amplifiers 3 can be transferred to an analog-to-digital converter (ADC) 388 by a parallel-to-serial multiplexer 387, subsequently yielding a digital image. The flat panel imager having an imaging array as described with reference to FIG. 3 can be capable of both single-shot (e.g., radiographic) and continuous (e.g., fluoroscopic) image acquisition. In the embodiment of FIG. 3, read-out integrated circuits (ROICs) can be provided with input shorting switches 389 to allow the data lines 384 to be electrically connected directly to a reference power supply 390 through application of an appropriate voltage (e.g., Vshort 392) to the shorting switches 389. For example, a switch 391 can selectively apply Vshort 392 to gates of the shorting switches 389.

As shown in FIG. 3, between radiographic capture series, the anode power supply 332, the reference power supply 390, and the shorting gate bias 392 are powered, allowing a VANODE to be applied to the anode of selected (e.g., all) photosensors 370 in the imaging array 312 and VREFERENCE to be supplied to all of the data lines 384. The gate drivers 328, the charge amplifiers 386 and the multiplexer 387 and A/D converter 388 can be without power or disconnected from a power supply. Since the reference and anode power supplies and the shorting gate voltage can comprise considerably less than 5%, 3%, 1%, or less of the power consumption of a fully powered radiographic detector, power drain during periods between image capture can be significantly reduced using the embodiment shown in FIG. 3.

Using certain exemplary photosensor control circuitry embodiments described herein, a first voltage can be maintained across photosensors of a portion of a radiographic imaging array for a radiographic detector when a power consumption of signal sensing circuits for the imaging array is less than 10%, less than 5%, less than 2%, less than 1%, or even less than 0.1% of the power consumption of the signal sensing circuits during readout of a signal from the portion of the imaging array by the signal sensing circuits. Using some exemplary photosensor power control circuitry embodiments described herein, a prescribed voltage can be applied across photosensors of a portion of a radiographic imaging array for a detector when signal sensing circuits are not able to discern a state of the photosensors of the portion of a radiographic imaging array. For example, the signal sensing circuits can not determine a state of the photosensors such as but not limited to whether the photosensors are powered, un-powered, integrating or discharging.

Figure 4:
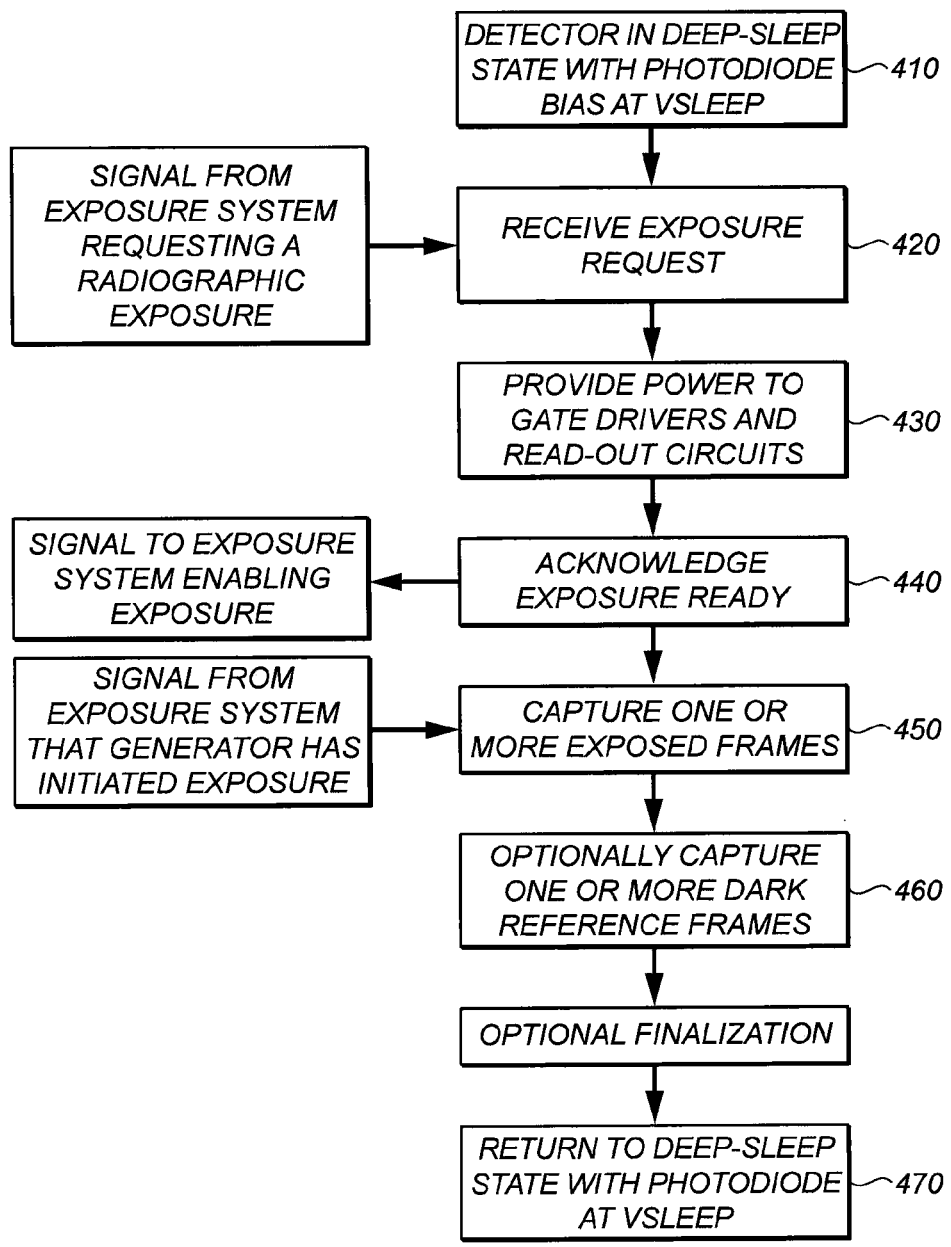
FIG. 4 is a flow chart that shows exemplary operations that can occur at the flat panel imager shown in FIG. 3.

FIG. 4 is a flow chart that shows exemplary operations of a radiographic detector such as the flat panel imager of FIG. 3. As shown in FIG. 4, prior to power-up for an exposure sequence, exemplary embodiments of a portable radiographic detector can be in a reduced power state that maintains photosensors at a prescribed condition different from an un-powered condition. As shown in FIG. 4, one embodiment can maintain photosensors 371 in a deep-sleep state since the end of a previous radiographic exposure series (operation block 410). Upon receipt of an exposure request (e.g., from the acquisition and control image processing 34) via a command interface (operation block 420), the detector can provide power to the digital logic, upon which time the DR detector can load firmware for the support electronics for the backplane. The detector can then enable power for the analog electronics, including the gate drivers 328 and the ROICs 330 (operation block 430). The detector then can acknowledge (e.g., to the acquisition control and image processing 34) an exposure ready signal (operation block 440), after which an operator can be permitted to enter an exposure sequence for the detector. After one or more exposed frames (operation block 450), the detector may acquire one or more dark reference frames (operation block 460). Following transmission of the data to a radiographic image processing system for image processing, the dark reference frames can be subtracted from the exposed frames to yield an image representative of the photo-generated charge. Then, the portable detector can be powered-down to the deep-sleep state since the radiographic exposure series is complete (operation block 470).

As shown in FIG. 4, upon receipt of an exposure request, the power supplies for the gate driver 328 and the charge amplifiers 386, multiplexer 387 and ADC 388 of the read-out IC 330 can be enabled, bringing the DR panel 312 to full power mode. In one embodiment, these operations can be completed in less than 100 ms.

Figure 5:
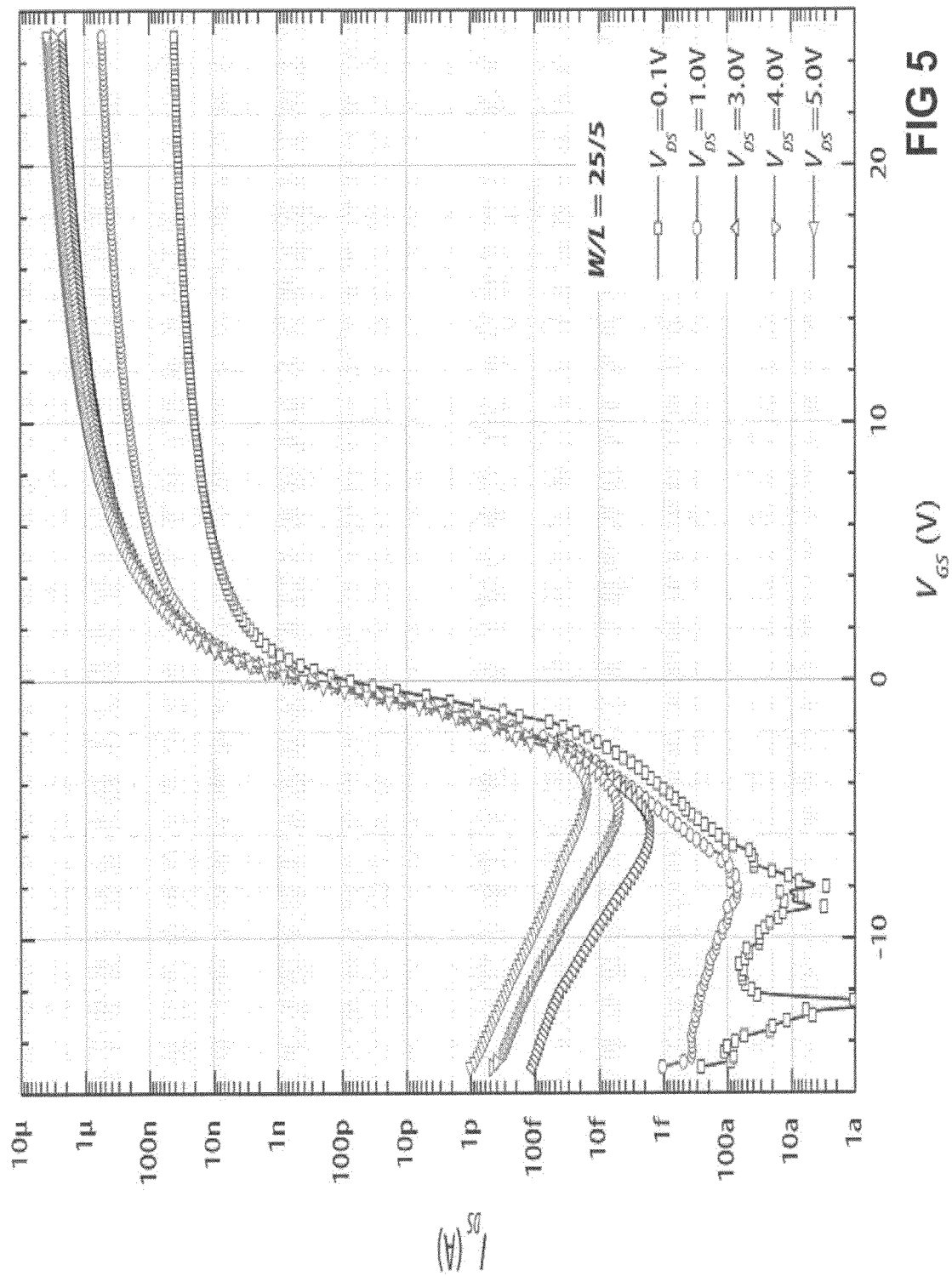
FIG. 5 is a diagram that shows transfer characteristics of an exemplary switch (e.g., TFT row-select switch) in a flat-panel radiographic imaging array that can be used in embodiments of the application.

In exemplary embodiments of FIGS. 3 and 4, row select lines 383 of the imaging array are not powered and can equilibrate at 0V with respect to ground (e.g., analog ground). FIG. 5 is a diagram that shows transfer characteristics of an exemplary TFT row-select switch that can be used in exemplary embodiments described herein such as in a flat-panel radiographic imaging array. As shown in FIG. 5, the resistance at VDS=0.1V and VGS=0 V is $1 \times 10^9 \Omega$. The dark current of photosensors for flat-panel imaging applications can be 100 pA/cm$^2$ to 500 pA/cm$^2$, depending on temperature and/or photosensor processing conditions. For an exemplary 150 μm square pixel with 50% fill factor and dark current of 500 pA/cm$^2$, photosensor dark current can be 56 fA and the voltage drop across the TFT would be less than 50 μV. Thus, in this example, exemplary embodiments can bias photosensors at a voltage within 50 μV of the voltage difference VSLEEP=VANODE−VREFERENCE. In one embodiment for reduced or minimal transient responses from a photodiode between sleep and image capture, VSLEEP can be equal to the bias voltage VBIAS during capture. However, exemplary embodiments operating with VSLEEP closer to 0V than VBIAS can provide a reduced transient as compared to a photosensor at 0V between captures and/or can have advantages in long-term reliability of the photosensor, and therefore, reliability of a DR detector.

Figure 6A:
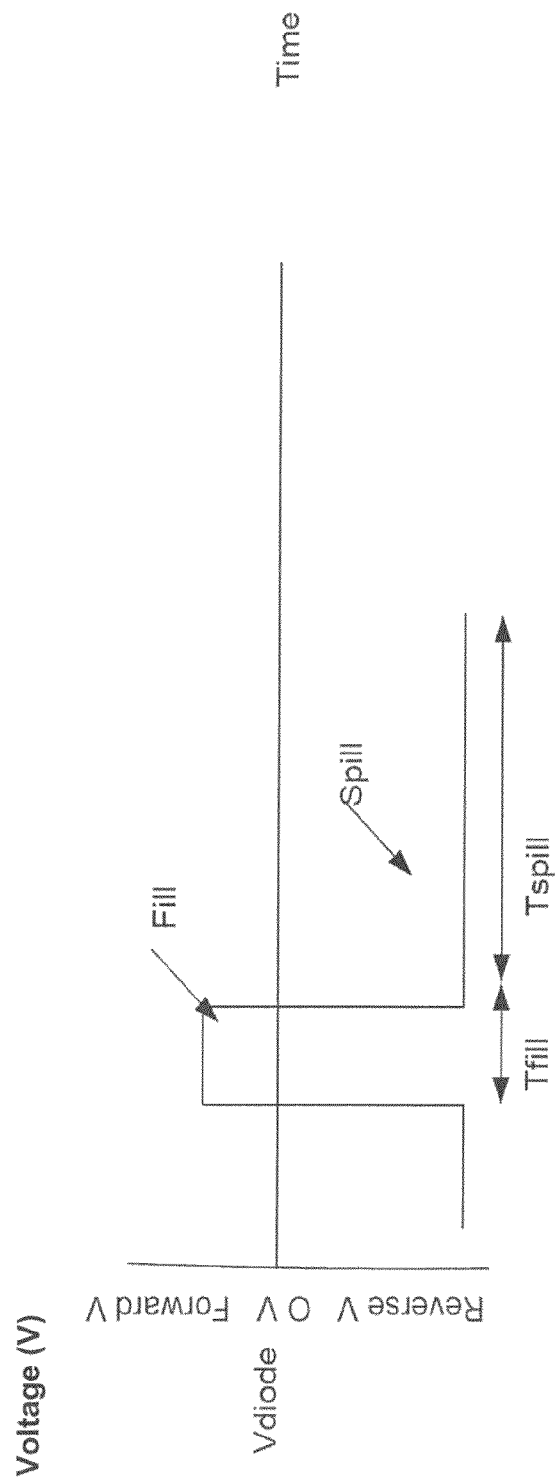
Figure 6C:
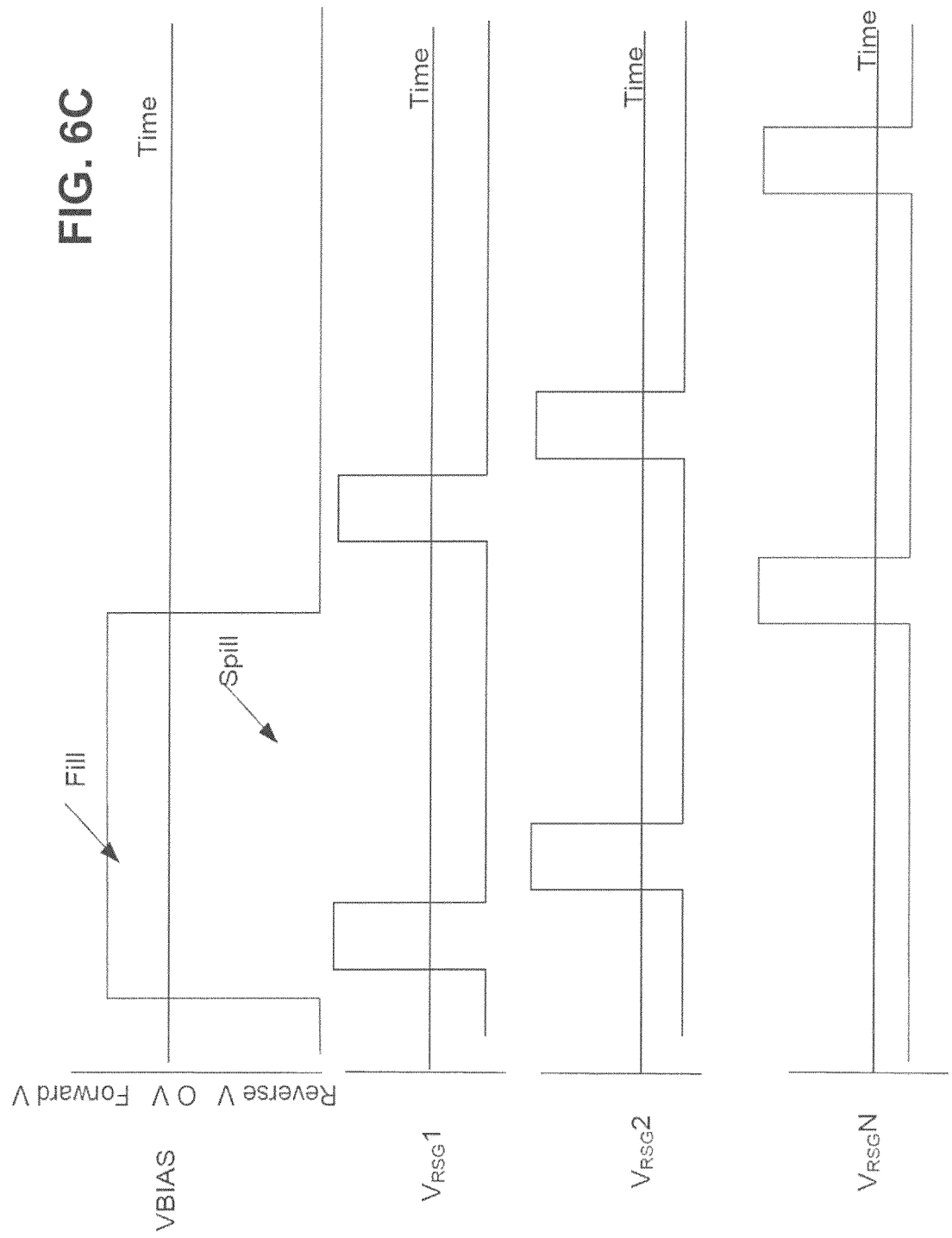

Embodiments can include an optional pixel initiation upon the transition from a low-power sleep mode to an imaging operations mode of a DR detector. A pixel initialization can optionally be performed to erase any memory of one or more previous exposure series stored in the trap occupancy. In clinical settings, the time between exposure series can be, for example, as short as 1 minute or as long as several days. Since the emission time constant of band-center trap states can be several minutes, the trap occupancy of at least traps near band center of the photosensors can contain a residual memory of a previous exposure series. A photosensor initialization or photosensor reset can allow a residual memory stored in the trap occupancy distribution to be reduced or erased. Non-limiting exemplary timing sequences for a photosensor/photodiode initialization are shown in FIGS. 6A-6C according to the application. Timing sequences shown in FIGS. 6A-6C comprise a fill-period and a spill-period. During the fill period, Vreset and/or Vbias can be controlled to produce a net photosensor bias Vbias=Vanode−Vreference=Vfill that can be either forward biased or less reverse biased than a photosensor bias during exposure. Applying a forward bias or a reverse bias closer to 0V to the photodiode 371 can fill a significant fraction of traps in the photosensor to a level closer to the conduction and valence band edges than the charge stored in traps close to the band center, which can contain the memory of the previous exposure series. During the spill period, Vreset and/or Vbias can be controlled (e.g., switched) to return the photodiode 371 to the spill voltage Vspill. In one exemplary embodiment, Vspill reverse biases the photosensor with a value approximating the photosensor bias during exposure. During the Vspill period, a large fraction of the traps emit charge and the charge is removed through the anode and cathode of the photodiode. For preferable exemplary fill and spill cycles, the net trap occupancy after one or more fill and spill cycle is independent of the initial state of the photosensor (e.g., erasing the memory of the previous history of the photosensor).

FIG. 6A is a diagram that shows an exemplary timing sequence for global, or parallel, initialization of a detector imaging array according to the application. In global initialization, the row select voltages of all gate lines can be switched to a establish a conducting state in the row select TFTs simultaneously to apply Vbias=Vanode−Vreference to all photosensors in the imaging array. While all row select gates are conducting, Vbias can be held at the fill voltage Vfill for a period of time Tfill, then switched to the spill voltage Vspill for a period of time Tspill.

FIG. 6B is a diagram that shows an exemplary timing sequence for serial initialization of a detector imaging array according to the application. In serial initialization, Vbias=Vanode−Vreference can be set to the fill condition Vbias=Vfill. The row select line of a single row is switched to establish a conducting state in the row select TFTs of just that row, thereby applying Vbias=Vfill to all photosensors in that row. This serial addressing continues for all the gate lines in the imaging array. The Vbias=Vanode−Vreference can then be set to the spill condition Vbias=Vspill. The row select line of the first row is switched to establish a conducting state in the row select TFTs of just that row to apply Vbias=Vspill to all photosensors in that row. This serial addressing continues for all the gate lines in the array.

FIG. 6C is a diagram that shows an exemplary timing sequence for scrolling initialization of a detector imaging array according to the application. In scrolling reset, the row select lines can be turned on serially with a delay Tdelay from the previous row. Each row select line can be kept on for a period Ton where Ton>Tdelay. In one exemplary embodiment, Ton=M*Tdelay where M is in integer, such as but not limited to 4, 8, 16, 32, 64, etc. Thus at any one time, the photosensors in M rows are reset to Vfill. Once the scrolling reset has progressed through all gate lines, Vbias can be switched to Vspill and the scrolling reset progresses again through all gate lines.

In one embodiment, total time used for a single fill and spill cycle is in the range of 10 ms to 500 ms. Further, exemplary fill-and-spill cycles can be repeated multiple times to achieve increased or complete erasure of previous exposure series.

Upon reaching the powered state, the DR panel imaging array 312 is ready for image capture and can issue an exposure-ready signal (e.g., over a command interface).

Figure 7A:
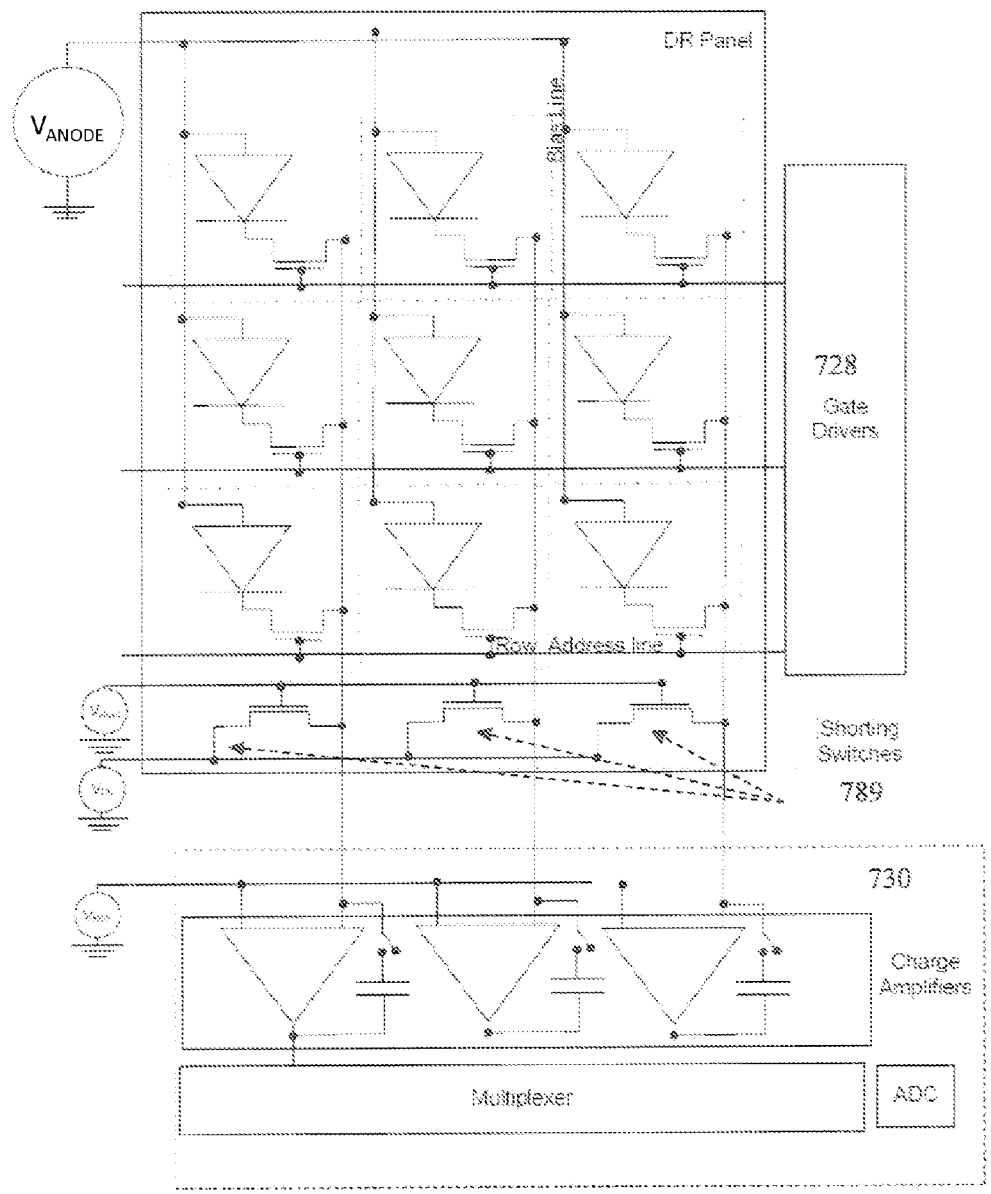
FIG. 7A is a diagram that shows a schematic for portions of an imaging array architecture for a radiographic detector including an embodiment of a photosensor low power control circuit according to the application.

FIG. 7A is a diagram that shows a schematic for portions of an imaging array architecture for a radiographic detector including an embodiment of a low power photosensor control circuit according to the application. As shown in FIG. 7A, shorting switches 789 can be provided using TFTs on the backplane (e.g., instead of in the ROIC circuit). Exemplary TFTs can sink the ~56 fA of dark current generated by each of the ~3,000 photosensors on a column, or ~150 pA, with negligible voltage drop. Transfer characteristics as shown in FIG. 5 show a channel resistance of 5 MΩ for a transistor of gate length 4 µm and gate width 25 µm. The voltage drop across such a TFT caused by the 150 pA of column dark current would be less than 1 mV, so that the voltage across the photodiode would be within 1 mV of the difference VSLEEP=VANODE−VDL.

Figure 7B:
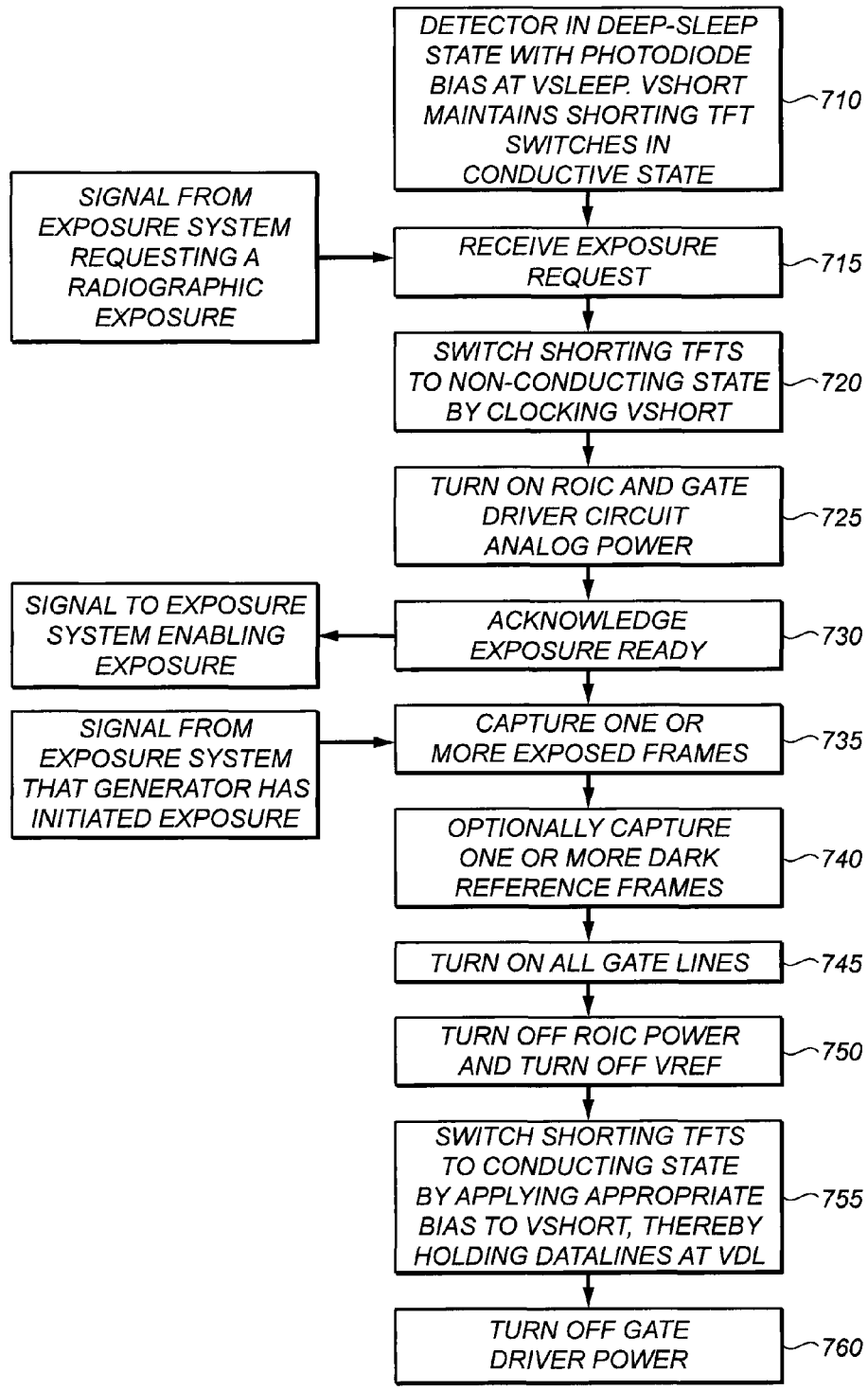
FIG. 7B is a flow chart that shows exemplary operations that can occur at the flat panel imager shown in FIG. 7A.

FIG. 7B is a flow chart that shows an exemplary operating sequence that can occur at a radiographic detector such as the flat panel imager shown in FIG. 7A. As shown in FIG. 7B, exemplary embodiments of a portable detector can be in a reduced power state that can maintain photosensors at a prescribed condition different from an off or on condition. As shown in FIG. 7B, one embodiment can maintain photosensors 371 in a deep-sleep state with photodiode bias at VSLEEP, and VSHORT can maintain shorting TFT switches 789 on (e.g., in a conductive state) after a previous radiographic exposure series (operation block 710). Upon receipt of an exposure request (e.g., from the acquisition and control image processing 34) via a command interface (operation block 715), the detector can switch the shorting TFT switches 789 off (e.g., in a non-conductive state) by clocking or driving VSHORT low (operation block 720). The detector can then provide power for the analog electronics, including the gate drivers 728 and the ROIC's 730 (operation block 725). The detector then can acknowledge (e.g., to the acquisition control and image processing 34) an exposure ready signal (operation block 730), after which the x-ray generator is permitted to execute an exposure sequence for the detector. After one or more exposed frames (operation block 735), the detector can optionally acquire one or more dark reference frames (operation block 740). Following transmission of the data (e.g., to the acquisition control and image processing 34), the portable detector can turn off power to all gates lines (operation block 745), and then turn off ROIC power and VREF (operation block 750). Then, the detector can switch the shorting TFT switches 789 on (e.g., in a conductive state) by driving VSHORT high or an appropriate bias can be applied to VCL, which can hold datalines at VDL (operation block 755). Then, gate driver power can be turned off to provide the low power state with photodiode 371 bias at VSLEEP (operation block 760).

FIG. 8A is a schematic diagram that shows portions of an imaging array architecture for a radiographic detector including an embodiment of a photosensor power control circuit according to the application. As shown in FIG. 8A, low current power supplies for VANODE 840 and VREF 890 are utilized during sleep mode and high current power supplies VANODE 840' and VREF 890' are utilized during operation. Since the power supply current requirement for VANODE 840 and VREF 890 during sleep mode can include only the total dark current generated by the ~10,000,000 pixels in the imaging array, or 560 nA, these power supplies VANODE 840 and VREF 890 can operate at very low power consumption. However, during operation, high current power supplies VANODE 840' and VREF 890' can be connected (e.g., VANODE 332 and VREF 390), to allow the supply of the higher currents required during operating mode.

Figure 8B:
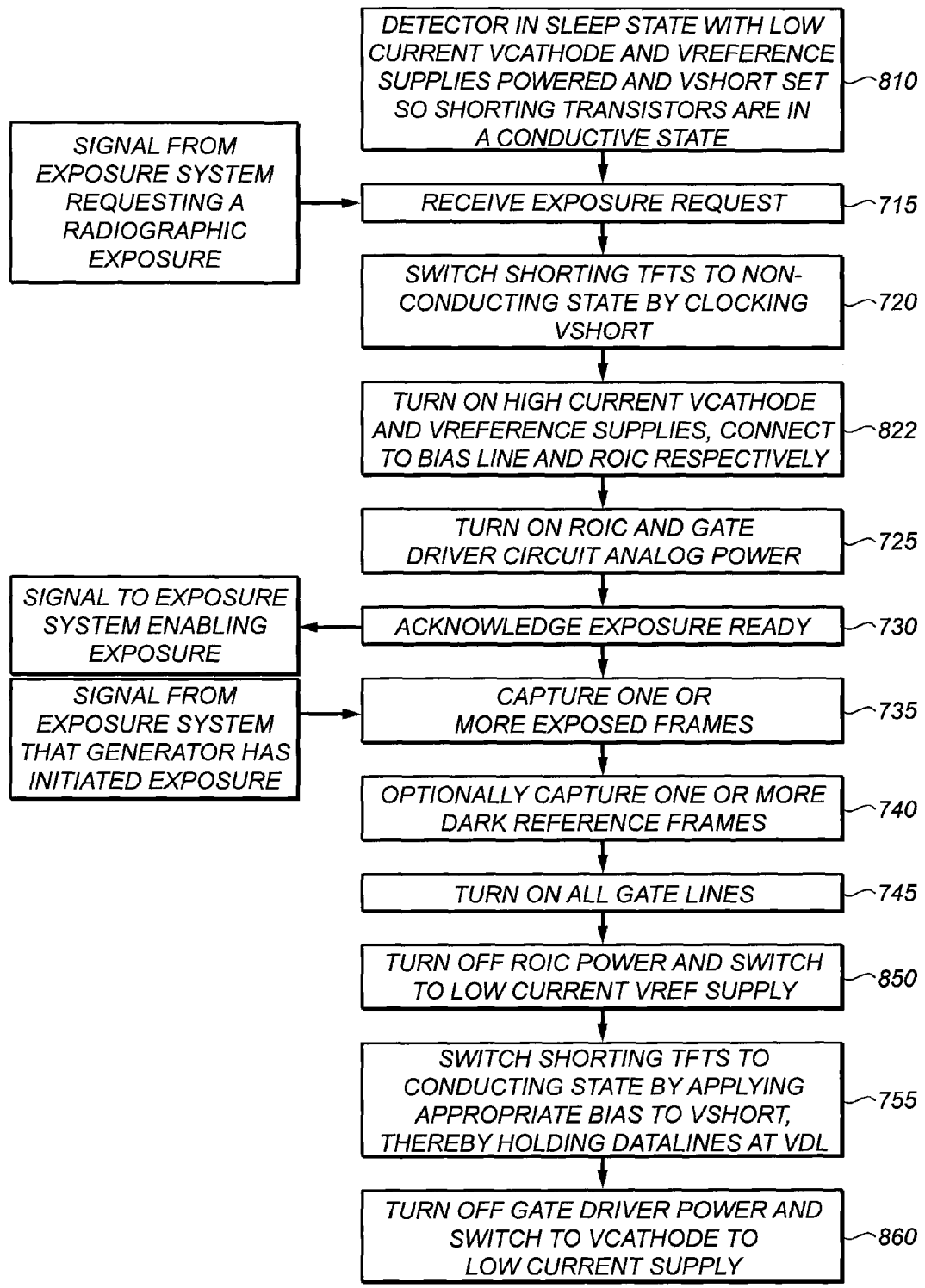
FIG. 8B is a flow chart that shows exemplary operations that can occur at the imaging array as shown in FIG. 8A.

FIG. 8B is a flow chart that shows an exemplary operating sequence that can occur at the flat panel imager shown in FIG. 8A. As shown in FIG. 8B, an exemplary operating sequence can be similar to that shown in FIG. 7B, however, low power supplies VANODE 840 and VREF 890 need to be switched in for use in sleep mode (operation blocks 810, 850, 860) and switched out for normal imaging operations (operation block 822).

Figure 9:
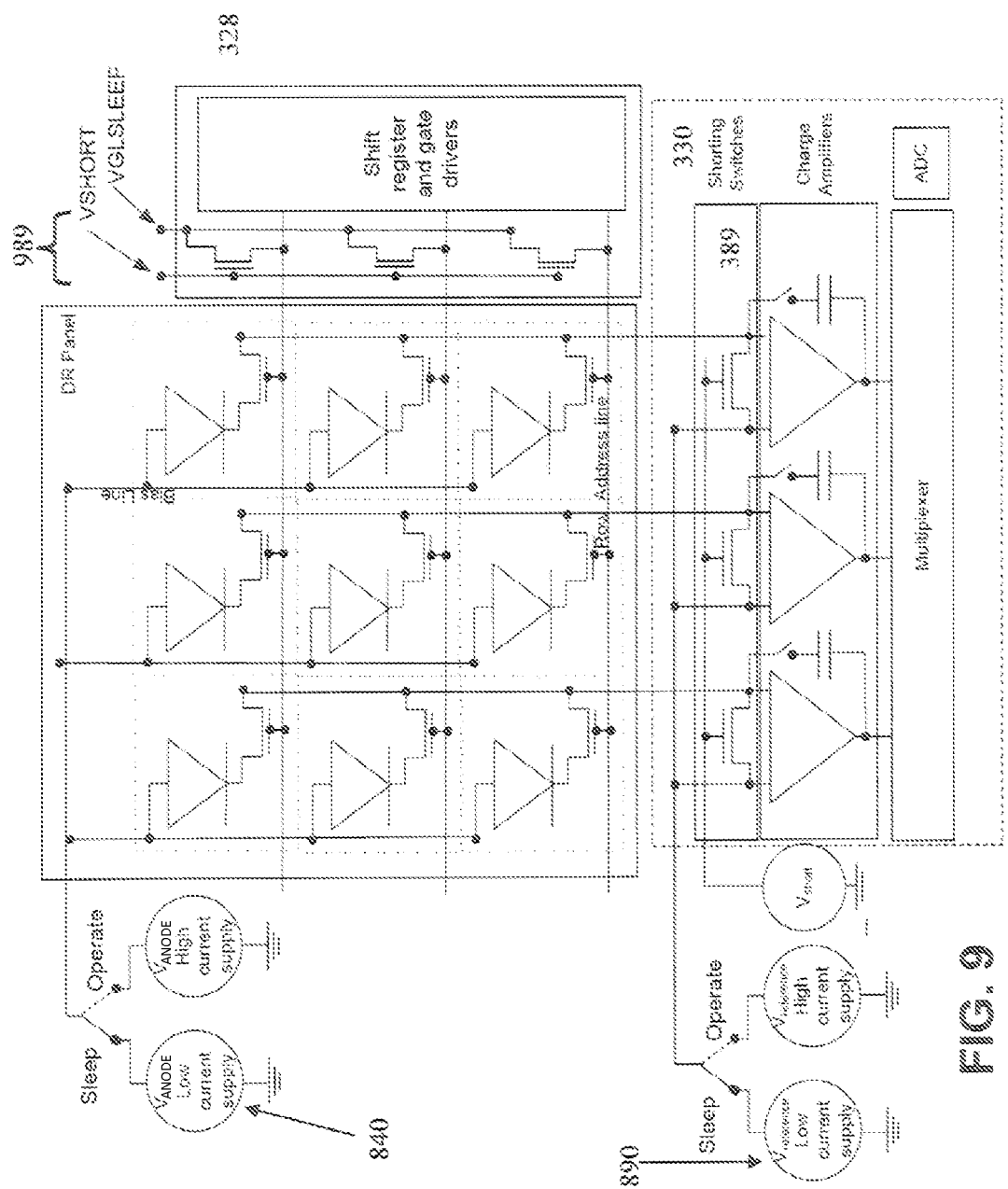
FIG. 9 is a diagram that shows another embodiment for a photosensor state control circuit of an imaging array architecture for a radiographic detector according to the application.

FIG. 9 is a diagram that shows another alternative embodiment in which shorting switches are provided for the gate lines in an imaging array for a DR detector. As shown in FIG. 9, exemplary shorting switches 989 can be provided in the gate driver circuits 328. In one embodiment, for sleep mode the shorting switches 989 can be turned on by VSHORT, thereby connecting all of the gate lines to a global gate voltage VGLSLEEP. To reduce or avoid long-term instability in the row select transistors on the backplane, VGSLEEP can be at a voltage much closer to 0V (e.g., 5V-10V) than the gate line on voltage during operation (e.g., 20V-30V). One benefit of the embodiment of FIG. 9 (e.g., over FIG. 3 or 7A) can be to ensure that the row select TFTs 371 are in a conductive state (e.g., always) independent of processing variations in threshold voltage of the row select TFTs 371 and/or possible changes in threshold voltage over long-term extended operations. Although the embodiment of FIG. 9 can incorporate the shorting switches 989 into the gate driver circuits 328, alternative embodiments can provide switches 989 in thin-film-transistors on the backplane (e.g., as part of the imaging array or DR panel), where each TFT can connect an individual gate line to a global gate voltage during sleep mode.

Figure 10:
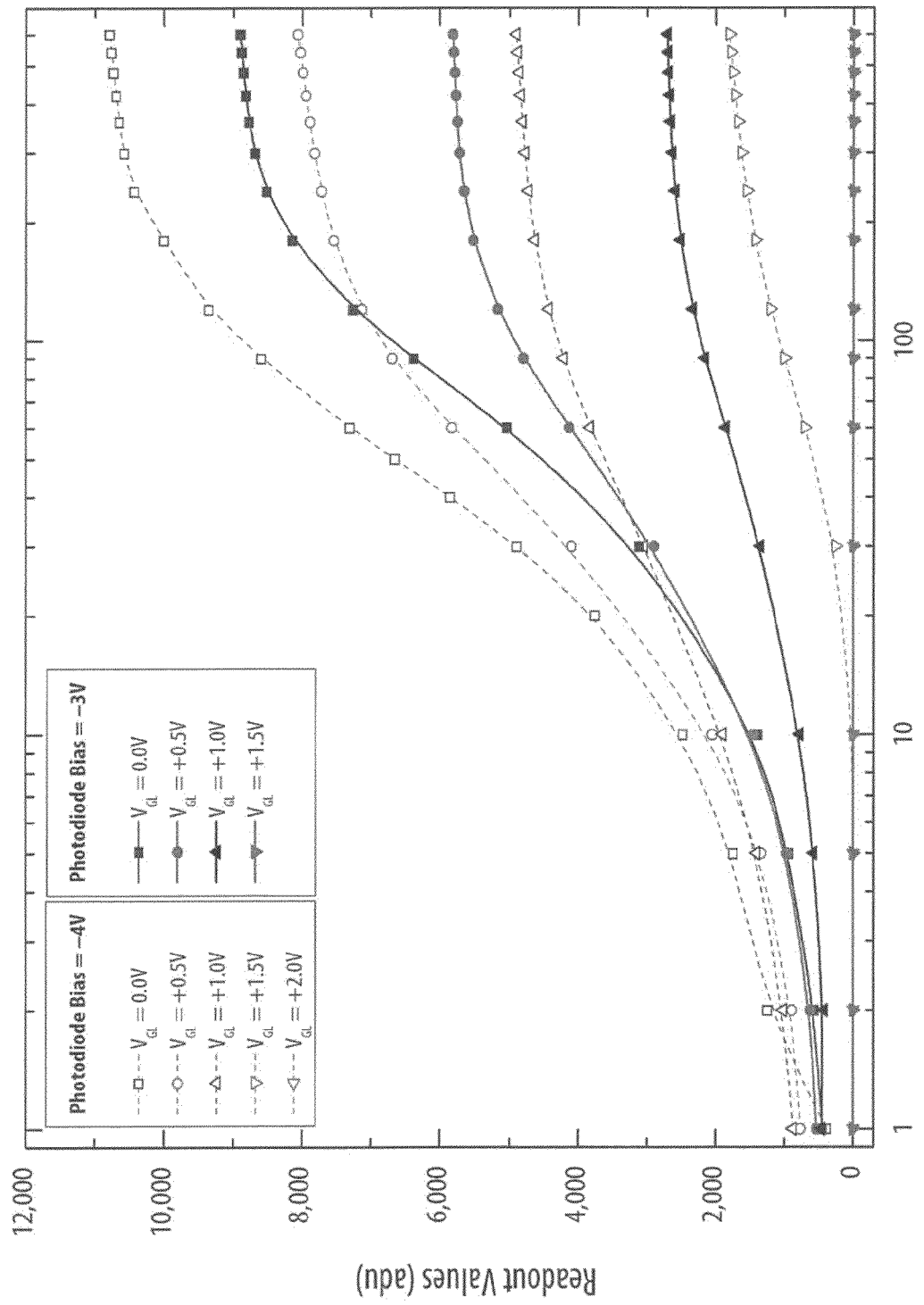
FIG. 10 is a diagram that shows representative measurement plots of dark charge released with different gate line voltages for a radiographic detector.

Further, for applications where time between captures are relatively long, erasing the dark charge can be achieved with different gate voltages. FIG. 10 shows representative measurement plots of dark charge released with different gate line voltages. As shown in FIG. 10, under 0V bias conditions, maintaining the photodiode bias can be difficult even at time frame of several seconds, and with higher gate line voltage, the bias condition can be maintained even after several minutes. Also shown in FIG. 10, the required gate line voltage is dependent on the photodiode bias. In one embodiment, lower photodiode bias can yield lower noise current, and therefore, lower gate line voltage can be used to maintain bias.

In the exemplary embodiments illustrated in FIG. 3 and FIGS. 7-9, power supplies for the reference voltage, the anode voltage and/or the gate line sleep voltage are operated at fixed DC voltages. However, embodiments herein are not intended to be so limited, for example, some photosensors, such as the MIS photosensor, require periodic refresh cycles. For such cases the power supplies used for reference, anode and/or gate line may be clocked periodically in order to execute the refresh cycle. In such cases, an additional delay may be required upon a receipt of exposure request in order to provide a fixed interval between the last refresh cycle and exposure enable.

Figure 11:
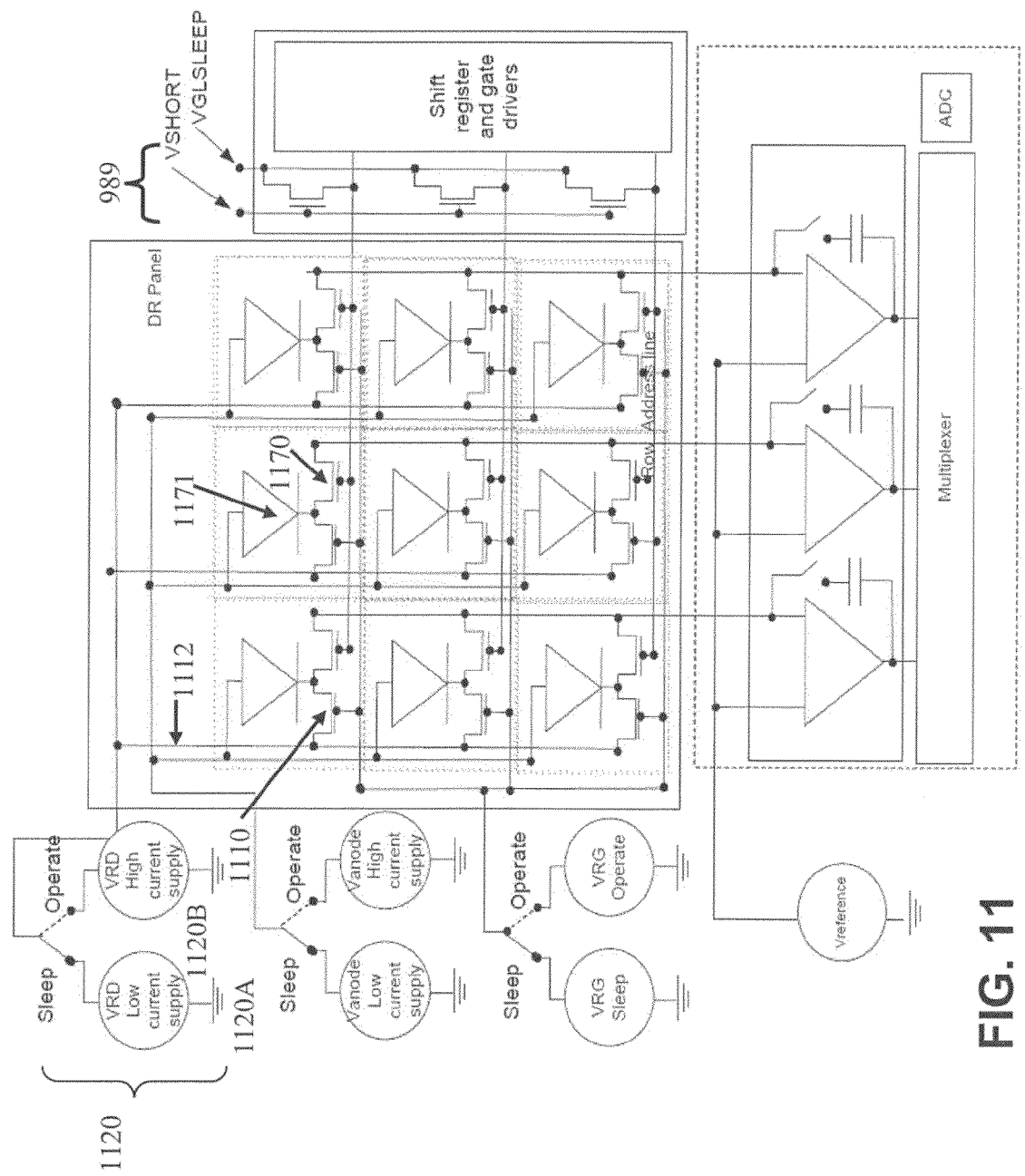
FIG. 11 is a diagram that shows another exemplary imaging array of a radiographic detector imaging array including an embodiment of a photosensor voltage control circuit according to the application.

FIG. 11 is a diagram that shows another exemplary imaging array of a flat-panel imaging array including an embodiment of a photosensor bias circuit. As shown in FIG. 11, a second transistor and second bias line can be included in each pixel. A second transistor 1110 and a second bias line 1112 can re-set the photosensor 1171 to the second bias line potential. The second transistor 1110 can be used to reset a portion or all of the pixels in the imaging array of a DR panel to a reset voltage 1120 prior to exposure. In one embodiment, the reset potential 1120 may be clocked in order to sequentially reset the photosensors to a first potential and then a second potential. Between exposure sequences, the photosensor 1171 can be held at the reset potential 1120 by holding the row select transistors 1170 at VRGSLEEP using the shorting switches 989 on the gate driver to maintain the gate lines in a non-conducting state, and holding the reset gate at VRGSLEEP, thereby maintaining the reset transistors 1110 in a conducting state and electrically connected to the low-current cathode power supply 1120A. Upon receipt of an exposure request, the reset gate can be switched to VRGOPERATE, the reset potential set to high-current cathode power supply 1120B, the gate driver shorting switches 989 can be set to a non-conducting state, and the gate driver and read-out ICs powered on. Following an exposure sequence, the DR panel can be cycled back to the sleep mode.

Figure 12A:
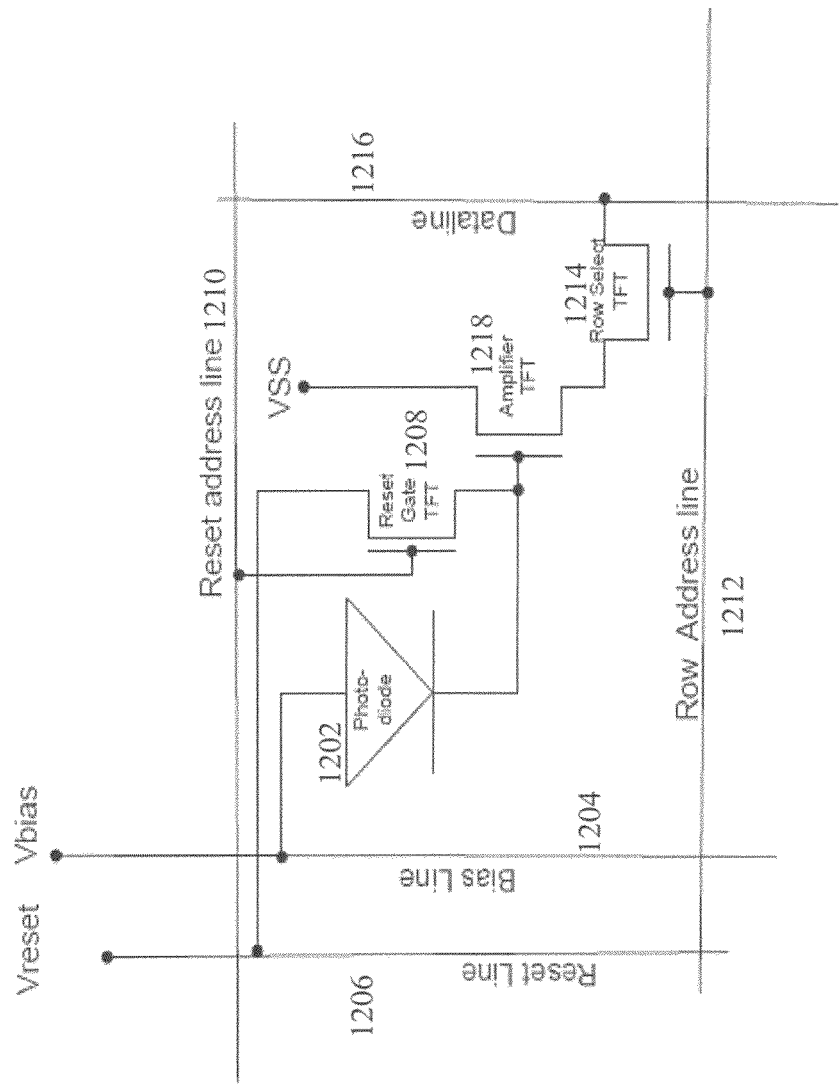
FIG. 12A is a diagram that shows a schematic of a pixel architecture for portion of an imaging array for a radiographic detector that can be used with embodiments according to the application.

FIG. 12A is a diagram that shows another exemplary pixel that can be used in embodiments herein and can include an amplifier transistor in addition to a row-select transistor and a reset transistor. Active pixel flat-panel imaging backplanes have been realized with transistors implemented in amorphous silicon, low-temperature polycrystalline silicon, indium-gallium-zinc-oxide (IGZO) and other semiconductor materials such as but not limited to organic photosensors and poly-crystalline photosensors. A requirement for rapid power-up has not been addressed in the related art for such active pixel flat-panel imaging arrays. As shown in FIG. 12A, bias (e.g., VBIAS) can be supplied to the anode of the photo sensor 1202 by the bias line 1204. Bias can be supplied to the cathode of the photosensor 1202 by a reset line 1206 gated by a reset transistor 1208. Prior to image capture, the reset transistor 1208 can be set to a conducting state by the reset address line 1210, thereby resetting the voltage across photosensor 1202 to the difference between the bias line potential (e.g., VBIAS) and the reset line potential (e.g., VRESET). Following reset, the imaging array can be exposed, discharging the photosensor 1202. Upon readout, the row-address lines 1212 can be sequentially addressed, switching a row select transistor 1214 in a selected row into a conducting state. A current source external to the imaging area of the array can be attached to each data line 1216. The voltage on the cathode can be sensed by the amplifier transistor 1218, and the voltage change on the data line 1216 is sensed by a voltage amplifier (e.g., read out circuit) at one end of the data line 1216.

Figure 12B:
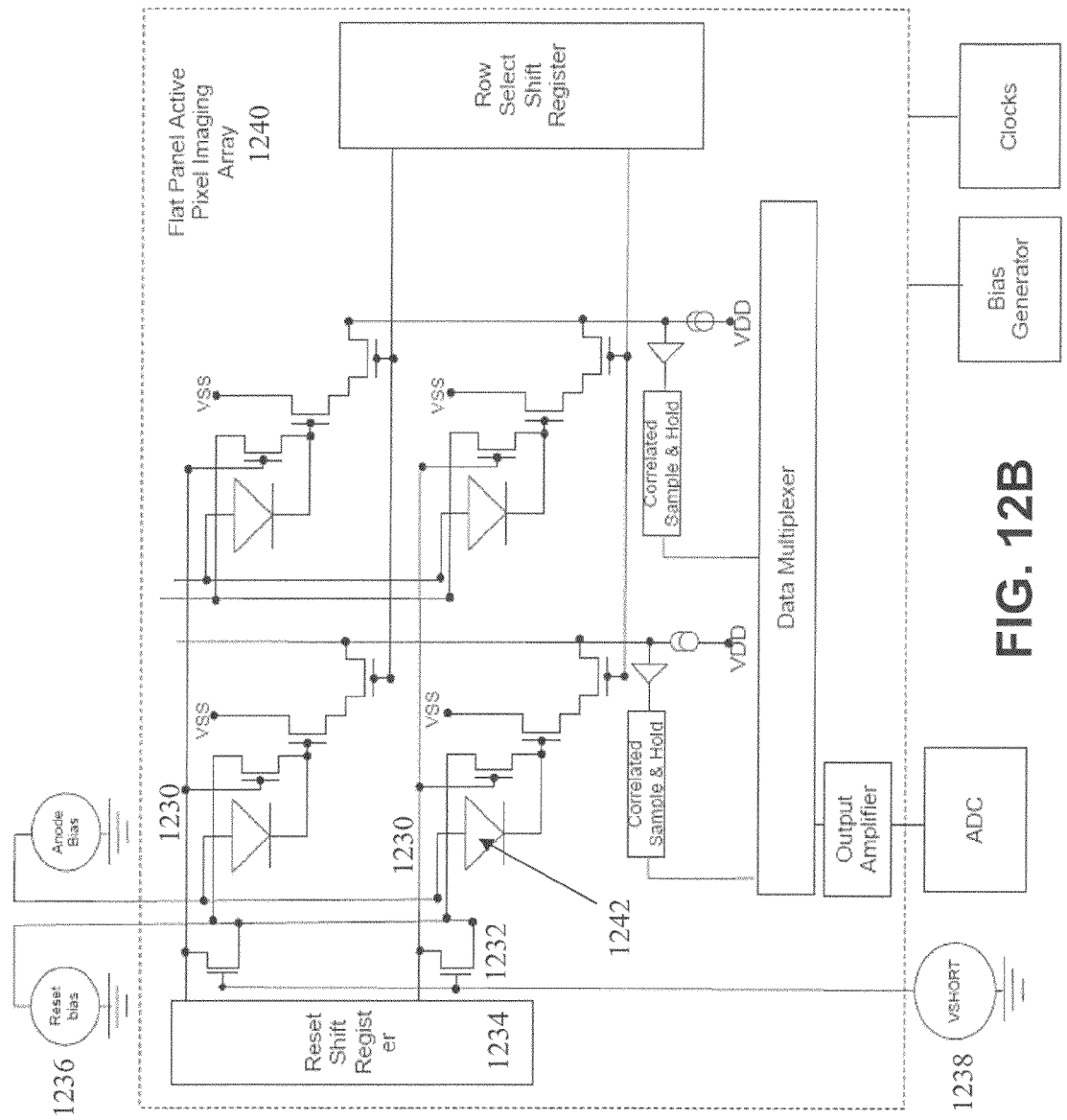
FIG. 12B is a diagram that shows another exemplary imaging array of a radiographic detector imaging array including an embodiment of a photosensor power control circuit according to the application.

FIG. 12B is a diagram that shows another exemplary imaging array of a DR imaging array including an embodiment of a photosensor bias circuit. As shown in FIG. 12B, an imaging array can include an active pixel transistor and an embodiment of a photosensor power control circuit. As shown in FIG. 12B, an imaging array 1240 includes registers for row-select, reset-gate select, column multiplexing as well as circuits for column current sources, column amplifiers, signal sampling and bias supplies. In one embodiment, these circuits can be realized in thin-film transistors on the same substrate as the pixels or imaging array 1240, although it will be recognized that they could also be implemented in integrated circuits external to the imaging array 1240. In the embodiment shown in FIG. 12B, each reset line 1230 can be connected to a shorting TFT 1232 in addition to being connected to the reset shift register 1234 to allow all reset lines 1230 to be electrically connected to VRESET 1236 simultaneously upon VSHORT 1238 switching the shorting TFTs 1232 into a conducting state. Alternatively, when the reset shift register is actively addressing individual reset lines, VSHORT 1238 can be set so as to place the shorting TFTs into a non-conducting state. External support circuits can include analog to digital conversion (ADC), bias supplies for the on-panel circuits and pixel voltages, and/or clock generation.

Figure 12C:
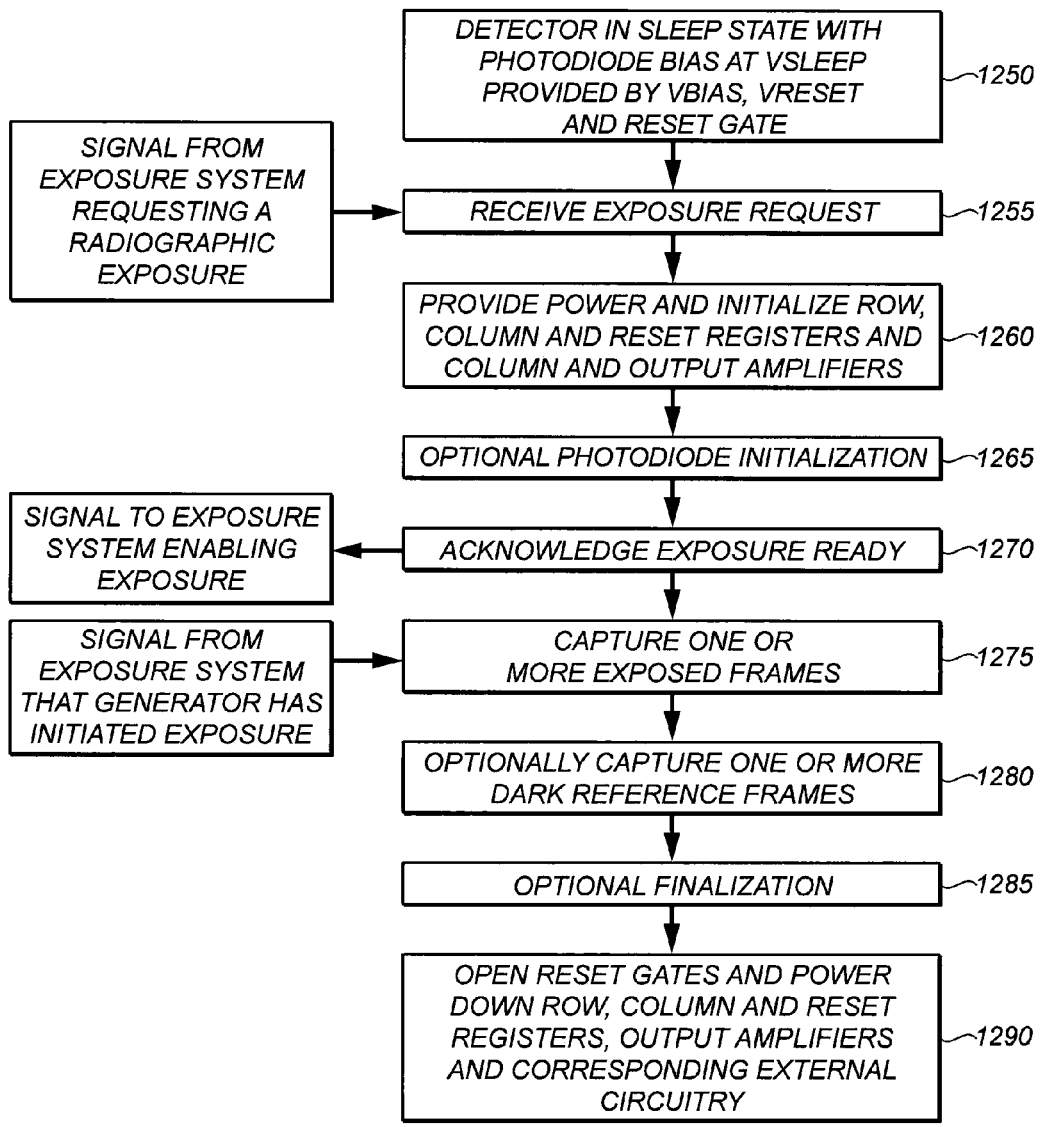
FIG. 12C is a flow chart that shows exemplary operations that can occur at the imaging array as shown in FIG. 12B.

FIG. 12C is a flow chart that shows an exemplary embodiment of an method for operating a power control circuit for an imaging array of a DR detector. As shown in FIG. 12C, the method embodiment can be implemented for example, on the apparatus embodiment shown in FIG. 12B. In between exposure series, embodiments of DR detector imaging arrays can be maintained in a low power biased photosensor mode (operation block 1250). In the embodiment shown in FIG. 12B (e.g., a photosensor is a PIN photodiode), a photodiode potential can be maintained at a reverse bias approximating the potential of the photodiode during exposure or imaging operations. The bias supplies Vreset and Vbias (e.g., Vanodebias) are powered in order to provide a bias voltage VBIAS across photodiodes 1242. The reset gate for all the pixels is in a conducting state during a sleep period. This can be achieved by setting the shorting clock VSHORT to place all of the shorting TFTs in a conducting state, thereby connecting Vreset to the cathode of all of the photodiodes 1242. In operation block 1250, some or all other on-panel and off-panel circuits may be powered down, allowing a low power sleep mode.

Upon receipt of an exposure request (operation block 1255), the shift registers and power supplies are initialized (operation block 1260). An optional pixel initialization can be performed to erase memory of the previous exposure series stored in the trap occupancy (operation block 1265). Exemplary optional pixel initialization can include one or more combinations of a fill-period and a spill-period. During the fill period, Vreset and/or Vbias can be switched to produce a net phodiode bias (e.g., Vbias–Vreset) that can be either forward biased or less reverse biased than an operational photodiode bias during exposure to fill traps of interest. During the spill period, Vreset and/or Vbias can be switched to return the photodiode to a value approximating the photodiode bias during exposure. During an exemplary spill period, a large fraction of the traps emit charge and the charge can be removed through the anode and cathode of the photodiode. For selected fill and spill cycles, the net trap occupancy after one or more fill and spill cycle can be independent of the initial state of the photodiode, which can reduce or erase the memory of the previous history of the photodiode. Such pixel initialization can be performed globally through the shorting TFTs, or it can be performed on one or more rows at a time by addressing the reset line of each row through the reset shift register.

Following the optional photodiode initialization, VSHORT can be set to place the shorting transistors in a non-conducting state and the panel provides an expose-ready signal over the command interface to a radiographic image processing system (operation block 1270). Following exposure, panel readout is initiated by clocking the row select shift register. Optionally, the photodiodes may be reset after read a row at a time, allowing the column sample-and-hold circuits to sample the pixel signals before and after reset (operation block 1275). Following readout of the exposed frame, one or more dark reference frames may be captured (operation block 1280). An optional finalization sequence can be performed in order to erase memory of the exposure sequence in the photodiodes (operation block 1285). In one embodiment, a finalization sequence can include one or more fill-and-spill cycles (e.g., described herein). The imaging array is then powered down with Vshort set to maintain the shorting transistors to a conducting state and Vbias and Vreset maintained in a powered state to hold a net photodiode bias to a value approximating the voltage on the photodiode during exposure (operation block 1290).

Figure 13A:
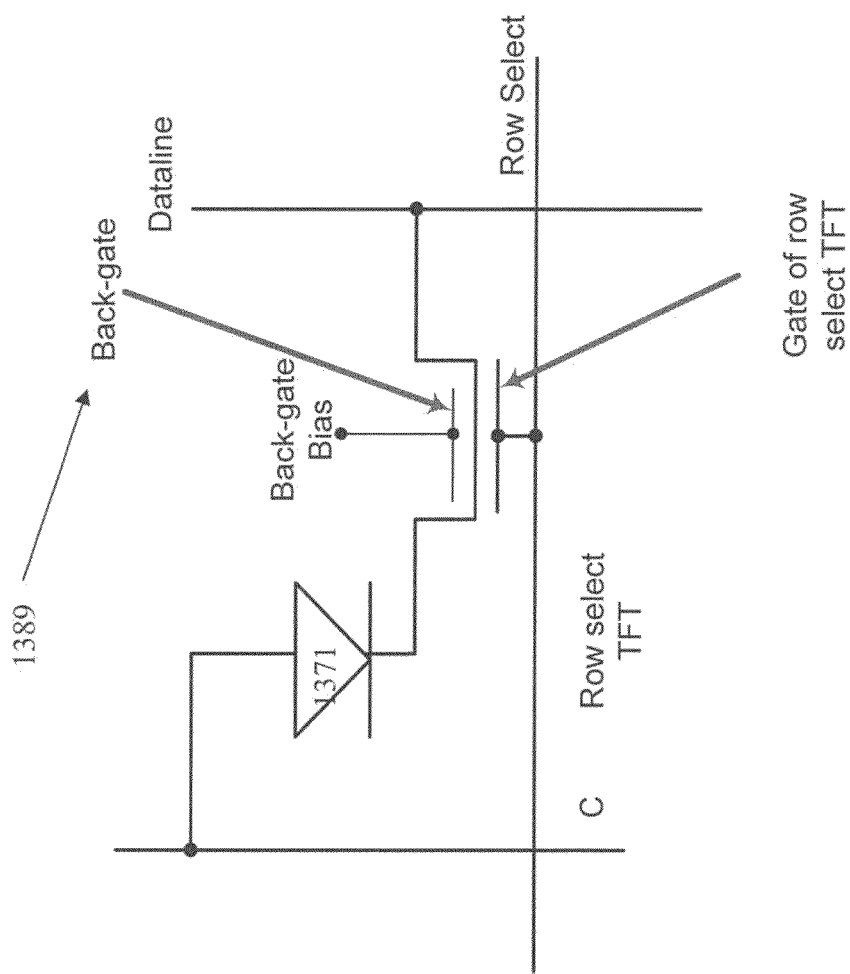
FIG. 13A is a diagram that shows a schematic for portions of an imaging array architecture for a radiographic detector including an embodiment of a photosensor low power control circuit according to the application.
Figure 13B:
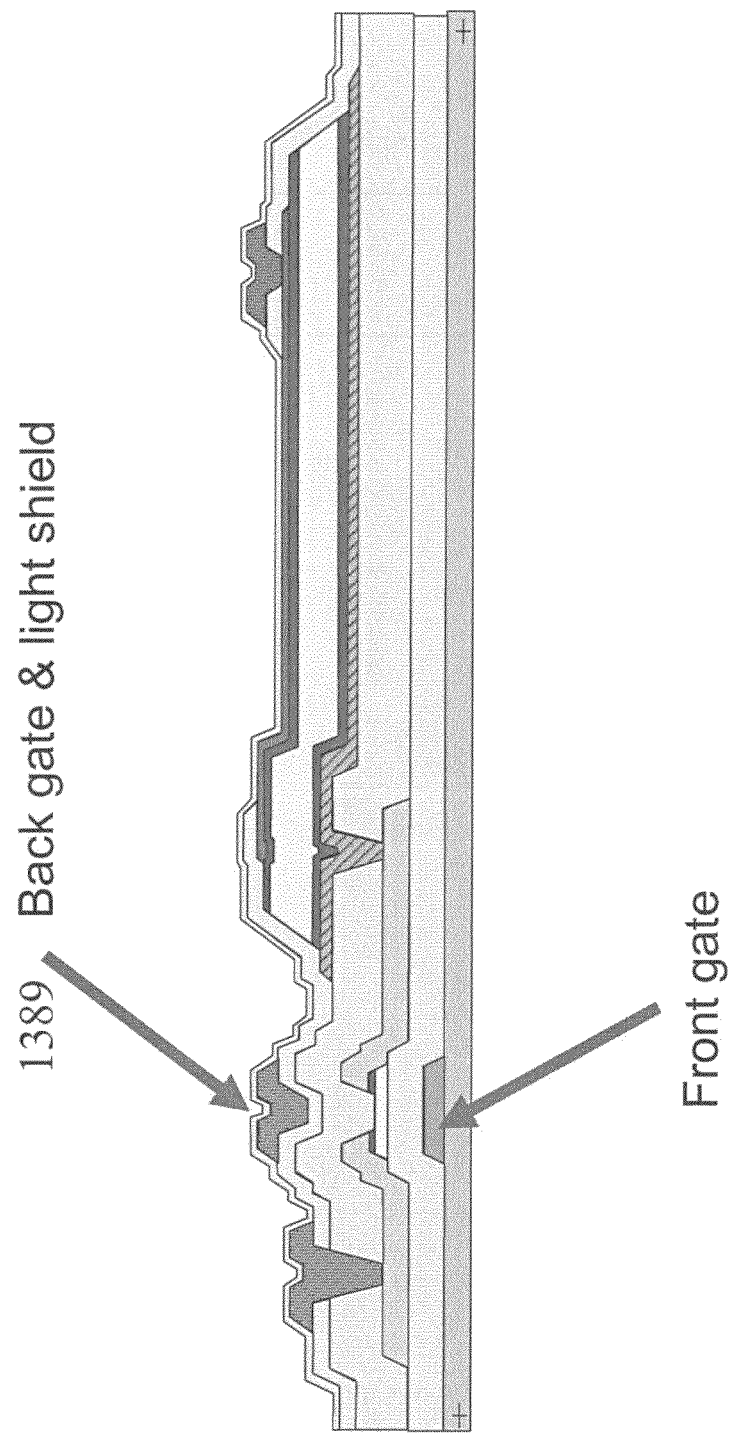
FIG. 13B is a diagram that shows a portion of a cross-sectional view of an imaging array architecture capable of implementing the radiographic detector of FIG. 13A.

FIG. 13A is a diagram that shows a schematic for portions of an imaging array architecture for a radiographic detector including an embodiment of a photosensor power control circuit. FIG. 13B is a diagram that shows a portion of a cross-sectional view of an imaging array architecture capable of implementing the radiographic detector of FIG. 13A. As shown in FIG. 13A, in another embodiment of the pixel circuit for a radiographic detector, a back-gate 1389 on the row select TFT can be used to control the state of all row select TFT's in the imaging array globally using a low-power DC power source, which can enable the row address circuitry for the imaging array to be powered off. The back gates 1389 of all the TFT's in at least a portion of the imaging array can be connected to the power control circuitry. FIG. 13B shows a cross-section of the pixel through the TFT. The back-gate 1389 can also serve as a light-shield for the TFT, which can reduce or prevent light-induced transistor instability. In the low power mode, the back gate 1389 of exemplary n-channel amorphous silicon TFT can be held in the conducting state by application of a positive voltage to the back-gate 1389. The row-select circuitry is preferably held in a power-off or deep sleep mode in which the front-gates of all the row select transistors are not connected to a bias (e.g., reference voltage). The back-gate 1389 can assure that all the row select transistors in the imaging array will be held in a conducting state, thereby allowing a photodiode 1371 bias to be maintained in a state ready for rapid transition into a state prepared for exposure. Since maintaining the bias on the photodiode 1371 requires only that the dark, or thermal, reverse current from the photodiode 1371 flow through the TFT, the back-gate 1389 bias can be small, for example +10V, greatly suppressing any threshold shift instability in the TFT. Since the back-gate 1389 can be completely surrounded by insulators, the power supply for the back gate 1389 can itself be very low power. Upon receipt of an exposure request, the back-gate 1389 can be switched to a negative voltage, for example ~−5V for an amorphous silicon TFT. During exposure and during readout, the front gate can also be maintained at an "off" voltage (e.g., ~−5V) except when the row is selected for readout, during which the front gate is clocked to an "on" voltage (e.g., ~+25V), switching the TFT into a conducting state.

Embodiments of methods and/or apparatus herein can provide a radiographic detector with capabilities that can include a photosensor voltage control circuit, low power detector sleep mode, rapid power-up to imaging operations and power-down from imaging operations to exemplary low power detector sleep modes.

In exemplary embodiments, signal sensing circuits for a radiographic imaging array can include at least one of analog electronics including gate drivers and read-out integrated circuits (ROICs), an analog to digital conversion circuit, an analog amplifier, a charge to voltage conversion circuit, a current to voltage conversion circuit, monocrystalline silicon integrated circuits, an analog multiplexer, a digital multiplexer or a data communication circuit.

In one embodiment, there is provided a digital radiographic area detector that can include an imaging array configured to include a plurality of pixels arranged at the area detector, each pixel to include at least one electrically chargeable photosensor and at least one thin-film transistor; a voltage control circuit to provide a reference voltage to each photosensor for a portion of the imaging array; circuits to provide scan address for the portion of the imaging array; circuits to provide signal sensing for the portion of the imaging array; and photosensor power control circuitry to maintain first voltage across photosensors of the portion of the imaging array when selected scan address circuits for the portion of the imaging array or selected signal sensing circuits for the portion of the imaging array are disconnected from a power supply.

While the invention has been illustrated with respect to one or more implementations, alterations and/or modifications can be made to the illustrated examples without departing from the spirit and scope of the appended claims. In addition, while a particular feature of the invention can have been disclosed with respect to only one of several implementations/embodiments, such feature can be combined with one or more other features of the other implementations/embodiments as can be desired and advantageous for any given or particular function. The term "at least one of" is used to mean one or more of the listed items can be selected. The term "about" indicates that the value listed can be somewhat altered, as long as the alteration does not result in nonconformance of the process or structure to the illustrated embodiment. Finally, "exemplary" indicates the description is used as an example, rather than implying that it is an ideal. Other embodiments of the invention will be apparent to those skilled in the art from consideration of the specification and practice of the invention disclosed herein. It is intended that the specification and examples be considered as exemplary only. The scope of the invention is indicated by the appended claims, and all changes that come within the meaning and range of equivalents thereof are intended to be embraced therein.

What is claimed is:

1. A digital radiographic area detector comprising:
    an imaging array comprising a plurality of pixels, each pixel comprising at least one electrically chargeable photosensor and at least one thin-film transistor;
    a bias control circuit to provide a bias voltage to the photosensors for a portion of the imaging array;
    circuits to provide row address for the portion of the imaging array;
    circuits to provide signal sensing for the portion of the imaging array; and
    photosensor power control circuitry to maintain a first voltage across photosensors of the portion of the imaging array when a power consumption of the signal sensing circuits is less than 10% of the power consumption of the signal sensing circuits during readout of a signal from the portion of the imaging array.

2. The digital radiographic area detector of claim 1, the photosensor power control circuitry to maintain the first voltage across the photosensors of the portion of the imaging array when the power consumption of the signal sensing circuits is less than 0.5% of the power consumption of the signal sensing circuits during readout of a signal from the portion of the imaging array.

3. The digital radiographic area detector of claim 2, where the signal is a result of exposure of the area detector to radiation.

4. The digital radiographic area detector of claim 1, where the first voltage is less negative than the bias voltage, where the first voltage is about equal to the bias voltage, or where the first voltage is a positive voltage.

5. The digital radiographic detector of claim 1, where a first electrode of the at least one thin-film transistor connects one terminal of the photosensor to a data line, a control electrode of the at least one thin-film transistor is connected to a row select line, the row select line driven by the row address circuits and the data line connected to the signal sensing circuits.

6. The digital radiographic area detector of claim 5, wherein the photosensor power control circuitry comprises a transistor switch for substantially every data line connecting the dataline to a control circuit.

7. The digital radiographic area detector of claim 5, wherein the photosensor power control circuitry comprises a first plurality of switches to connect data lines to a low power photosensor reference voltage when the photosensor power control circuitry is enabled.

8. The digital radiographic area detector of claim 7, wherein the photosensor power control circuitry comprises a second plurality of switches to connect row select lines to a low power reference voltage when the photosensor power control circuitry is enabled, where the first plurality of switches are located on imaging array or the signal sensing circuits and where the second plurality of switches are located on the imaging array or in a gate driver.

9. The digital radiographic area detector of claim 5, wherein the photosensor power control circuitry comprises a second plurality of switches to connect row select lines to a low power reference voltage when the photosensor power control circuitry is enabled, where the second plurality of switches are located on the imaging array or the row address circuits.

10. The digital radiographic area detector of claim 5, wherein the photosensor power control circuitry comprises at least one additional power source, where the at least one additional power source is used to provide the first voltage when the photosensor power control circuitry is enabled.

11. The digital radiographic area detector of claim 10, where the at least one additional power source comprises a low power bias voltage and a low power reference voltage and a low power row voltage.

12. The digital radiographic area detector of claim 10, where analog electronics including gate drivers and read-out integrated circuits (ROICs) are not powered in the low power non-zero voltage across photosensor terminals mode,
    where the photosensor power control circuitry in enabled to place the detector in a low power non-zero voltage across photosensor terminals mode.

13. The digital radiographic area detector of claim 5, wherein the photosensor power control circuitry comprises a second control electrode of the at least one thin-film transistor, where the second control electrode is connected to a low power photosensor reference voltage when the photosensor power control circuitry is enabled, and the row address circuitry is disconnected from a power supply.

14. The digital radiographic detector of claim 1, where the signal sensing circuits are silicon integrated circuits attached to data lines of the flat panel imaging array and comprise the transistor switch, the transistor switch being operable in the absence of power to the signal amplification circuitry, sampling circuitry or multiplexing circuitry.

15. The digital radiographic detector of claim 1, where the signal sensing circuits comprise at least one of an analog to digital conversion circuit, an analog amplifier, a charge to voltage conversion circuit, a current to voltage conversion circuit, an analog multiplexer, a digital multiplexer or a data communication circuit.

16. The digital radiographic area detector of claim 1, where the transistor comprises TFTs, MOS transistors, bipolar transistors and p-n junction components, where the photosensors comprise MIS photosensors, photo-transistors or a PIN photodiodes, and wherein the DR detector is a flat panel detector, a curved detector or a detector including a flexible imaging substrate, and where the digital radiographic area detector is a portable detector or battery powered.

17. A method of operating a digital radiographic detector producing at least one image signal, the radiographic detector including a plurality of photosensors arranged in rows and columns, the method comprising:

driving the detector in an operating mode where a first voltage is applied across the photosensors; and transitioning the detector to second mode where a second voltage is applied across the photosensors when signal sensing circuits are not able to discern a state of the photosensors.

18. The method of claim 17, where in the second mode, a power consumption of the signal sensing circuits is less than 5% or less than 1% of the power consumption of the signal sensing circuits during readout of a signal from the photosensors or read-out integrated circuits of the signal sensing circuits are disconnected from a power supply.

19. The method of claim 17, where the second voltage is more negative than the first voltage, where the second voltage is about equal to the first voltage, or where the second voltage is more positive than the first voltage.

20. The method of claim 17, where a finalization procedure occurs between the first operating mode and the second mode, where the finalization procedure can include driving the photosensors through a reset procedure.

* * * * *